(12) United States Patent
Lee

(10) Patent No.: US 12,469,522 B2
(45) Date of Patent: Nov. 11, 2025

(54) SEMICONDUCTOR DEVICE INCLUDING CHARGE RETENTION NODE

(71) Applicant: SK hynix Inc., Icheon-si (KR)

(72) Inventor: Woo Cheol Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 185 days.

(21) Appl. No.: 18/413,596

(22) Filed: Jan. 16, 2024

(65) Prior Publication Data

US 2025/0087248 A1 Mar. 13, 2025

(30) Foreign Application Priority Data

Sep. 7, 2023 (KR) ........................ 10-2023-0118766

(51) Int. Cl.
| | |
|---|---|
| *G11C 16/28* | (2006.01) |
| *G11C 5/06* | (2006.01) |
| *G11C 16/10* | (2006.01) |
| *G11C 16/26* | (2006.01) |
| *H10B 41/27* | (2023.01) |
| *H10B 43/27* | (2023.01) |

(52) U.S. Cl.
CPC .............. *G11C 5/063* (2013.01); *G11C 16/10* (2013.01); *G11C 16/26* (2013.01); *H10B 41/27* (2023.02); *H10B 43/27* (2023.02); *G11C 16/28* (2013.01)

(58) Field of Classification Search
CPC ...................................................... G11C 16/28
See application file for complete search history.

(56) References Cited

U.S. PATENT DOCUMENTS

| | | |
|---|---|---|
| 2011/0299336 A1 | 12/2011 | Chen et al. |
| 2018/0122478 A1 | 5/2018 | Morris et al. |
| 2020/0013795 A1* | 1/2020 | Dunga ................... H10B 43/35 |
| 2021/0272616 A1 | 9/2021 | Giterman et al. |

OTHER PUBLICATIONS

IEEE Journal of Solid-State Circuits, vol. 57, No. 2, Feb. 2022; "An Embedded NAND Flash-Based Compute-In-Memory Array Demonstrated in a Standard Logic Process" by Minsu Kim et al.
"Novel Vertical Channel-All-Around(CAA) IGZO FETs for 2TOC Dram with High Density beyond 4F2 by Monolithic Stacking" By Xinlv Duan et al. 2021 IEEE International Electron Devices Meeting (IEDM). IEDM21-222.

* cited by examiner

Primary Examiner — Jason Lappas

(57) ABSTRACT

A semiconductor device may include first and second transistors on a substrate. The first transistor may include first and second source/drain regions; a first channel region between the first and second source/drain regions; a first gate electrode over the first channel region; and a charge retention node between the first channel region and the first gate electrode. The second transistor may include third and fourth source/drain regions, a portion of the third source/drain region being connected to the charge retention node; a second channel region between the third and fourth source/drain regions; and a second gate electrode over the second channel region.

20 Claims, 23 Drawing Sheets

150

150

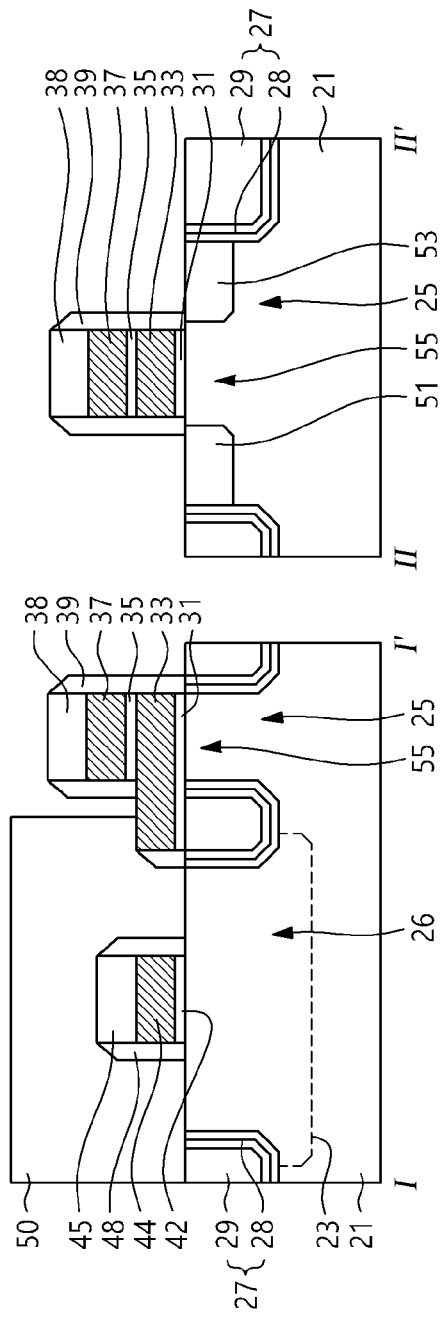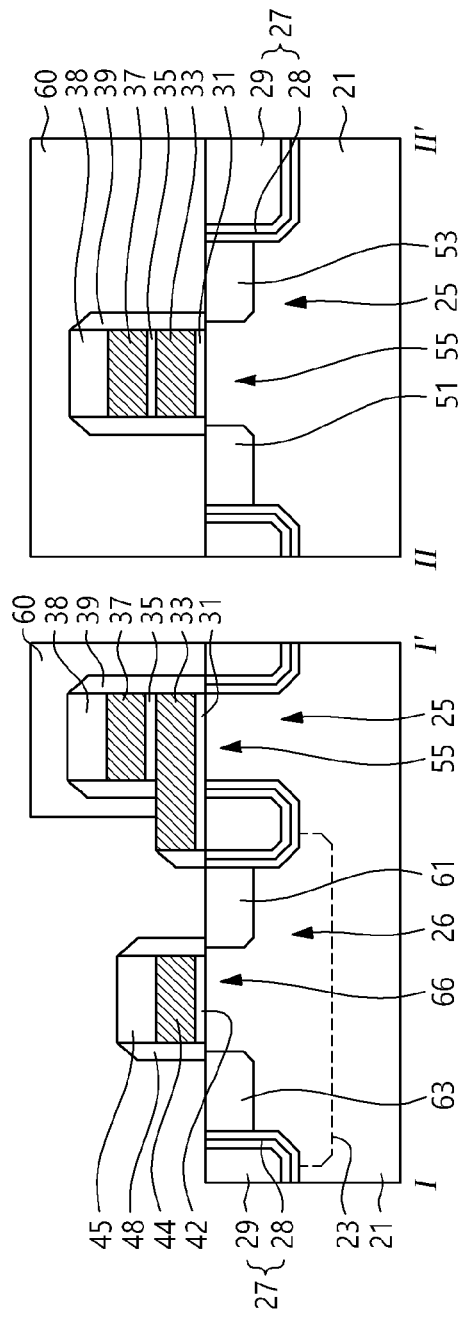

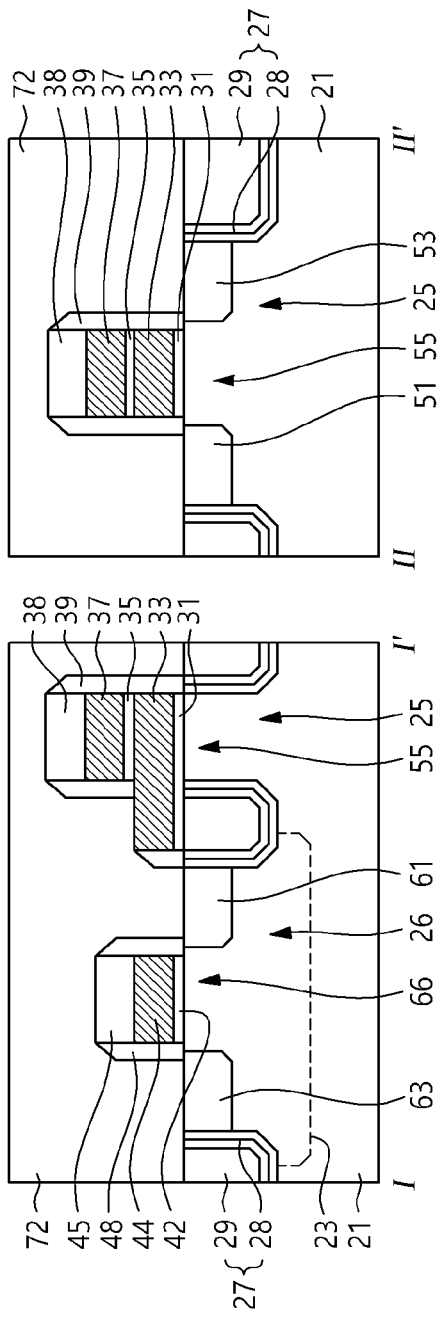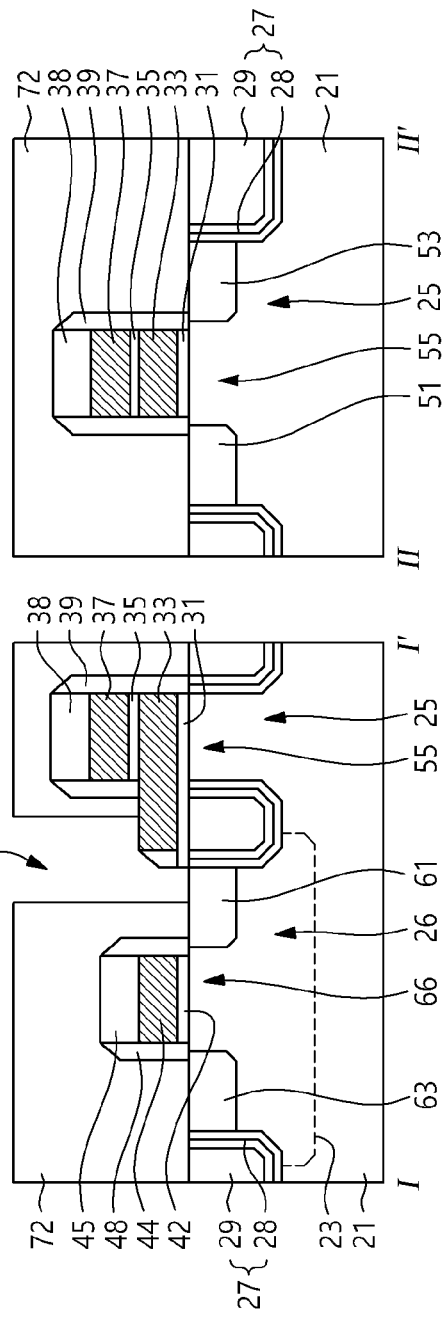

SEMICONDUCTOR DEVICE INCLUDING CHARGE RETENTION NODE

CROSS-REFERENCE TO RELATED APPLICATION

The present application claims priority under 35 U.S.C. § 119(a) to Korean Patent Application No. 10-2023-0118766 filed in the Korean Intellectual Property Office on Sep. 7, 2023, which is incorporated herein by reference in its entirety.

BACKGROUND

1. Technical Field

Various embodiments generally relate to a semiconductor device including a charge retention node and a method for forming the same.

2. Related Art

As electronic systems trend toward high performance, high-speed operating memory devices must be developed. A memory device that uses a floating gate or a charge trap layer exhibits limitations in improving operation speed. Technology for improving the operation speed of a memory device by combining a plurality of transistors is being researched. Technology for implementing a highly integrated memory device by combining a plurality of transistors faces various problems, such as crosstalk.

SUMMARY

Various embodiments are directed to providing a semiconductor device that improves operation speed and is advantageous for high integration, and a method for forming the same.

In an embodiment, a semiconductor device may include first and second transistors disposed on a substrate. The first transistor may include first and second source/drain regions; a first channel region between the first and second source/drain regions; a first gate electrode over the first channel region; and a charge retention node between the first channel region and the first gate electrode. The second transistor may include third and fourth source/drain regions, a portion of the third source/drain region being connected to the charge retention node; a second channel region between the third and fourth source/drain regions; and a second gate electrode over the second channel region.

In an embodiment, a semiconductor device may include a read word line extending in a row direction. A write word line spaced apart from the read word line in a column direction. A plurality of write bit lines, spaced apart from each other, that intersect with the read word line and the write word line may be provided. A plurality of read bit lines which intersect with the read word line and the write word line and are spaced apart from each other may be provided. A plurality of memory cells adjacent to intersections of the plurality of write bit lines and the plurality of read bit lines with the read word line and the write word line may be provided. Each of the plurality of memory cells may include a read transistor and a write transistor. The read transistor may include a first gate electrode over a channel region; and a charge retention node between the channel region and the first gate electrode. The write transistor may include a source/drain region connected to the charge retention node; and a second gate electrode connected to the first gate electrode.

In an embodiment, a semiconductor device may include first and second read word lines spaced apart from each other in a column direction. Each of the first and second read word lines may extend in a row direction. First and second write word lines are spaced apart from each other in the column direction. Each of the first and second write word lines may extend in the row direction. A first write bit line, which intersects with the first and second read word lines and the first and second write word lines, may be provided. A first read bit line, which intersects with the first and second read word lines and the first and second write word lines, may be provided. A first memory cell adjacent to intersections of the first write bit line and the first read bit line, which intersect with the first read word line and the first write word line, may be provided. A fourth memory cell adjacent to intersections of the first write bit line and the first read bit line, which intersect with the second read word line and the second write word line may be provided. The first memory cell may include a first read transistor and a first write transistor. The fourth memory cell may include a fourth read transistor and a fourth write transistor. The first read transistor may include first and second source/drain regions; a first channel region between the first and second source/drain regions; a first gate electrode over the first channel region; and a charge retention node between the first channel region and the first gate electrode. The first source/drain region of the first read transistor may contact a third channel region of the fourth read transistor. The first write transistor may include third and fourth source/drain regions, the third source/drain region being connected to the charge retention node; a second channel region between the third and fourth source/drain regions; and a second gate electrode over the second channel region.

According to the embodiments of the disclosed technology, a memory cell that includes a read transistor and a write transistor may be provided. The read transistor may include a charge retention node between a channel region and a first gate electrode. A source/drain region of the write transistor may be connected to the charge retention node. A second gate electrode of the write transistor may be connected to the first gate electrode of the read transistor. The first gate electrode and the second gate electrode may be connected to a write word line. The disclosed embodiments minimize crosstalk and improve operation speed so that a semiconductor device which is advantageous for high integration may be implemented.

BRIEF DESCRIPTION OF THE DRAWINGS

FIGS. 24 to 31 are cross-sectional views illustrating a method for forming a semiconductor device according to embodiments of the disclosure.

DETAILED DESCRIPTION

Figure 1:
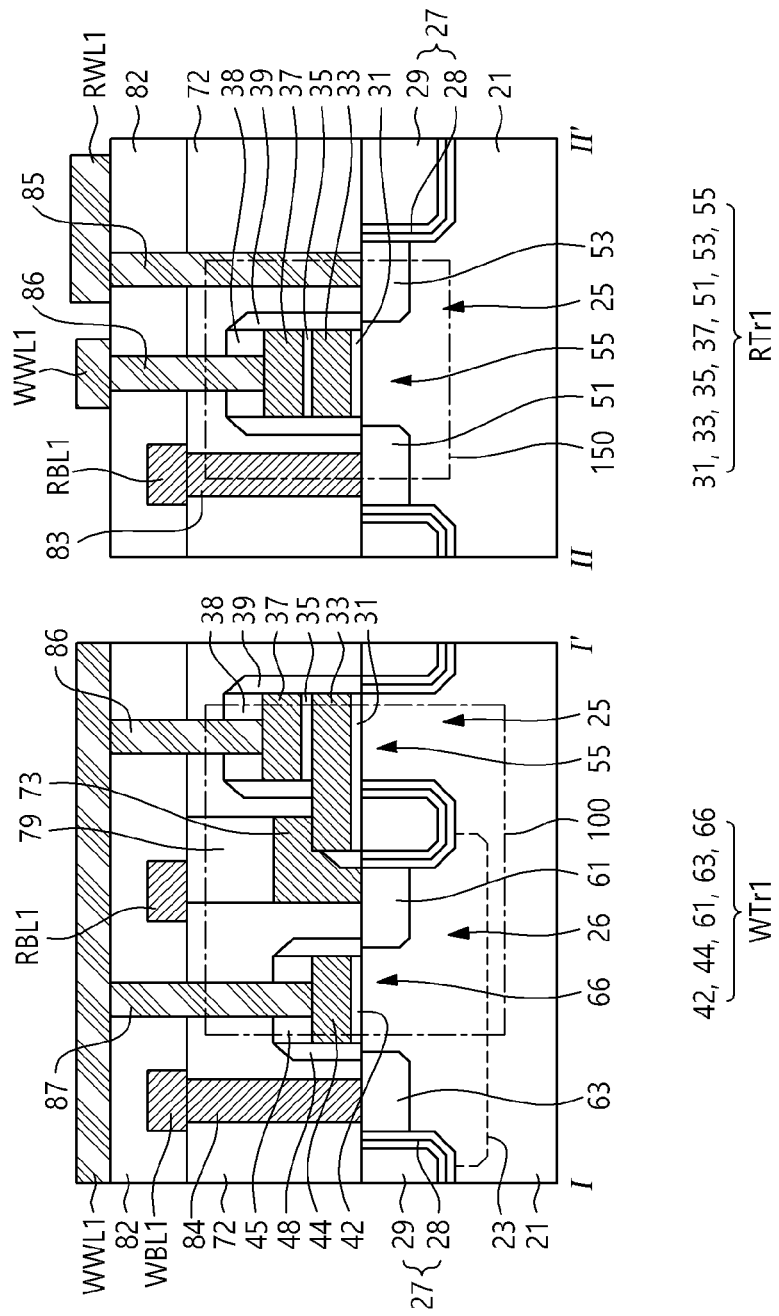
FIG. 1 is a cross-sectional view illustrating a semiconductor device according to an embodiment of the disclosure.
Figure 2:
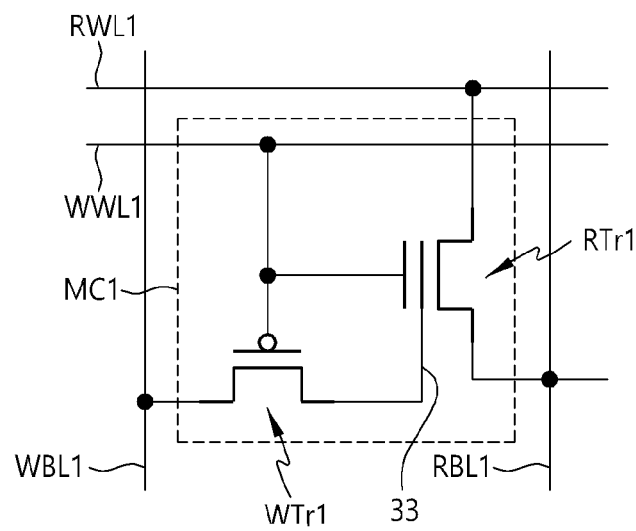
FIG. 2 is an equivalent circuit diagram of a semiconductor device according to an embodiment of the disclosure.
Figure 3:
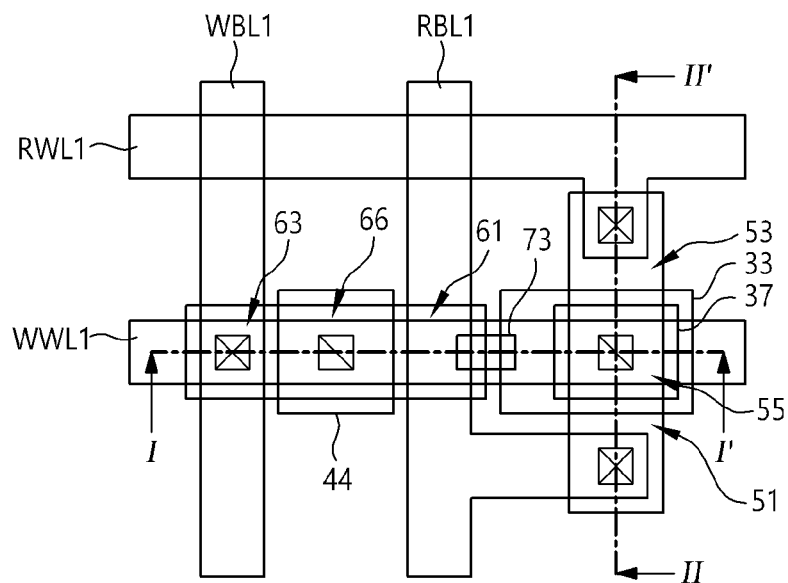
FIG. 3 is a layout diagram illustrating a semiconductor device according to an embodiment of the disclosure.
Figure 4:
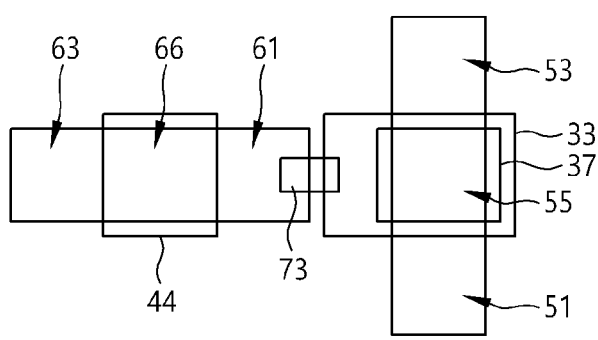
FIG. 4 is a layout diagram illustrating some components shown in FIG. 3.

FIG. 1 is a cross-sectional view illustrating a semiconductor device according to an embodiment of the disclosure, FIG. 2 is an equivalent circuit diagram of a semiconductor device according to an embodiment of the disclosure, FIG. 3 is a layout diagram illustrating a semiconductor device according to an embodiment of the disclosure, FIG. 4 is a layout diagram illustrating some components shown in FIG. 3, FIGS. 5 to 11 are partial views illustrating portions of FIG. 1. FIG. 1 may refer to cross-sectional views taken along the lines I-I' and II-II' of FIG. 3. In an embodiment, a semiconductor device according to an embodiment of the disclosure may include a 2 transistor 0 capacitor (2T0C) memory.

Referring to FIG. 1, a semiconductor device may include a substrate 21, a first well 23, a first active region 25, a second active region 26, an isolation layer 27, a channel dielectric layer 31, a charge retention node 33, a first gate dielectric layer 35, a first gate electrode 37, a first capping pattern 38, a first gate spacer 39, a second gate dielectric layer 42, a second gate electrode 44, a second capping pattern 45, a second gate spacer 48, a first source/drain region 51, a second source/drain region 53, a first channel region 55, a third source/drain region 61, a fourth source/drain region 63, a second channel region 66, a first interlayer insulating layer 72, an interconnection 73, a contact capping pattern 79, a second interlayer insulating layer 82, a first contact plug 83, a second contact plug 84, a third contact plug 85, a fourth contact plug 86, a fifth contact plug 87, a first read word line RWL1, a first read bit line RBL1, a first write word line WWL1, and a first write bit line WBL1.

The channel dielectric layer 31, the charge retention node 33, the first gate dielectric layer 35, the first gate electrode 37, the first source/drain region 51, the second source/drain region 53 and the first channel region 55 may configure a first read transistor RTr1. The second gate dielectric layer 42, the second gate electrode 44, the third source/drain region 61, the fourth source/drain region 63 and the second channel region 66 may configure a first write transistor WTr1. In an embodiment, the first read transistor RTr1 may correspond to a first transistor that is disposed on the substrate 21, and the first write transistor WTr1 may correspond to a second transistor that is disposed on the substrate 21.

The first well 23 may include impurities of a conductivity type different from those in the substrate 21. In an embodiment, the substrate 21 may include P-type impurities, and the first well 23 may include N-type impurities. The first active region 25 may be delimited in the substrate 21 by the isolation layer 27. The second active region 26 may be delimited in the first well 23 by the isolation layer 27.

The first source/drain region 51 and the second source/drain region 53 may be disposed in the first active region 25. The first channel region 55 may be delimited in the first active region 25 between the first source/drain region 51 and the second source/drain region 53. In an embodiment, the first channel region 55 may include P-type impurities, and the first source/drain region 51 and the second source/drain region 53 may include N-type impurities.

The third source/drain region 61 and the fourth source/drain region 63 may be disposed in the second active region 26. The second channel region 66 may be delimited in the second active region 26 between the third source/drain region 61 and the fourth source/drain region 63. The second channel region 66 may include impurities of a conductivity type different from those in the first channel region 55. In an embodiment, the second channel region 66 may include N-type impurities, and the third source/drain region 61 and the fourth source/drain region 63 may include P-type impurities.

The channel dielectric layer 31, the charge retention node 33, the first gate dielectric layer 35, the first gate electrode 37 and the first capping pattern 38 may be sequentially stacked on the first channel region 55. The charge retention node 33 may cross the first active region 25, and may extend onto the isolation layer 27. The channel dielectric layer 31 may be interposed between the first channel region 55 and the charge retention node 33 and between the isolation layer 27 and the charge retention node 33. The first gate spacer 39 may be disposed on the side surfaces of the first capping pattern 38, the first gate electrode 37, the first gate dielectric layer 35, the charge retention node 33 and the channel dielectric layer 31.

The second gate dielectric layer 42, the second gate electrode 44 and the second capping pattern 45 may be sequentially stacked on the second channel region 66. The second gate spacer 48 may be disposed on the side surfaces of the second capping pattern 45, the second gate electrode 44 and the second gate dielectric layer 42.

The first interlayer insulating layer 72, which covers the first read transistor RTr1 and the first write transistor WTr1, may be disposed on the substrate 21. The interconnection 73, which contacts the upper and side surfaces of the charge retention node 33 and contacts the third source/drain region 61, may be disposed in the first interlayer insulating layer 72. The contact capping pattern 79, which covers the interconnection 73, may be disposed in the first interlayer insulating layer 72. A portion of the third source/drain region 61 may be connected to the charge retention node 33 through the interconnection 73.

The first contact plug 83 may be disposed to contact the first source/drain region 51 by passing through the first interlayer insulating layer 72, and the second contact plug 84 may be disposed to contact the fourth source/drain region 63 by passing through the first interlayer insulating layer 72. The first read bit line RBL1 and the first write bit line WBL1 may be formed on the first interlayer insulating layer 72. The first read bit line RBL1 may contact the first contact plug 83. The first read bit line RBL1 may be connected to the first source/drain region 51 through the first contact plug 83. The first write bit line WBL1 may contact the second contact plug 84. The first write bit line WBL1 may be connected to the fourth source/drain region 63 through the second contact plug 84.

The second interlayer insulating layer 82, which covers the first read bit line RBL1 and the first write bit line WBL1, may be disposed on the first interlayer insulating layer 72. The third contact plug 85 may be disposed to contact the second source/drain region 53 by passing through the second interlayer insulating layer 82 and the first interlayer insulating layer 72. The fourth contact plug 86 may be disposed to contact the first gate electrode 37 by passing through the second interlayer insulating layer 82, the first interlayer insulating layer 72 and the first capping pattern 38. The fifth contact plug 87 may be disposed to contact the second gate electrode 44 by passing through the second interlayer insulating layer 82, the first interlayer insulating layer 72 and the second capping pattern 45. The first read word line RWL1 may be disposed on the second interlayer insulating layer 82 to contact the third contact plug 85. The first read word line RWL1 may be connected to the second source/drain region 53 through the third contact plug 85.

The first write word line WWL1 may be disposed on the second interlayer insulating layer 82 to contact the fourth contact plug 86 and the fifth contact plug 87. The first write word line WWL1 may be connected to the first gate electrode 37 and the second gate electrode 44 through the fourth contact plug 86 and the fifth contact plug 87, respectively.

In an embodiment, each of the first read transistor RTr1 and the first write transistor WTr1 may include a planar transistor, a recess channel transistor, a vertical transistor, a fin field effect transistor (finFET), a gate all around (GAA) transistor, a multi-bridge channel transistor, or a combination thereof.

Referring to FIG. 2, the first read word line RWL1 and the first write word line WWL1, which are spaced apart from each other, may be provided. Each of the first read word line RWL1 and the first write word line WWL1 may extend in a row direction. The first write word line WWL1 may be arranged in the column direction from the first read word line RWL1. The first write word line WWL1 may be aligned parallel to the first read word line RWL1. The first write bit line WBL1 and the first read bit line RBL1 may be spaced apart from each other. Each of the first write bit line WBL1 and the first read bit line RBL1 may extend in a column direction. The first read bit line RBL1 may be arranged in the row direction from the first write bit line WBL1. The first read bit line RBL1 may be aligned parallel to the first write bit line WBL1. Each of the first write bit line WBL1 and the first read bit line RBL1 may intersect with the first read word line RWL1 and the first write word line WWL1.

A first memory cell MC1 may be disposed adjacent to intersections of the first write bit line WBL1 and the first read bit line RBL1 with the first read word line RWL1 and the first write word line WWL1. The first memory cell MC1 may include a first read transistor RTr1 and a first write transistor WTr1. In an embodiment, the first read transistor RTr1 may be an NMOS transistor, and the first write transistor WTr1 may be a PMOS transistor.

Gate electrodes of the first read transistor RTr1 and the first write transistor WTr1 may be connected to the first write word line WWL1. One of a source and a drain of the first read transistor RTr1 may be connected to the first read word line RWL1, and the other of the source and the drain of the first read transistor RTr1 may be connected to the first read bit line RBL1.

The first read transistor RTr1 may include a charge retention node 33, which is disposed between the gate electrode and a channel region. One of a source and a drain of the first write transistor WTr1 may be connected to the charge retention node 33, and the other of the source and the drain of the first write transistor WTr1 may be connected to the first write bit line WBL1.

In an embodiment, the first read transistor RTr1 may be a PMOS transistor, and the first write transistor WTr1 may be an NMOS transistor.

Referring to FIG. 3, the first write word line WWL1 may be disposed parallel in the column direction of the first read word line RWL1. The first read bit line RBL1 may be disposed parallel in the row direction of the first write bit line WBL1. Each of the first write bit line WBL1 and the first read bit line RBL1 may intersect with the first read word line RWL1 and the first write word line WWL1.

The first channel region 55 may be disposed between the first source/drain region 51 and the second source/drain region 53. The charge retention node 33 may be disposed over the first channel region 55. The first gate electrode 37 may be disposed over the charge retention node 33, which is disposed over the first channel region 55. The first source/drain region 51 may be connected to the first read bit line RBL1. The second source/drain region 53 may be connected to the first read word line RWL1.

The second channel region 66 may be disposed between the third source/drain region 61 and the fourth source/drain region 63. The second gate electrode 44 may be disposed over the second channel region 66. The fourth source/drain region 63 may be connected to the first write bit line WBL1. The first gate electrode 37 and the second gate electrode 44 may be connected to the first write word line WWL1. The charge retention node 33 may be connected to the third source/drain region 61 through the interconnection 73.

FIG. 4 illustrates the charge retention node 33, the first gate electrode 37, the first source/drain region 51, the second source/drain region 53, the first channel region 55, the second gate electrode 44, the third source/drain region 61, the fourth source/drain region 63, the second channel region 66 and the interconnection 73 referenced in FIG. 3. The charge retention node 33 may be connected to the third source/drain region 61 through the interconnection 73.

Referring to FIGS. 1 to 3, a write or program operation of a first memory cell MC1 may include applying 1V or 0V to the first write bit line WBL1 and applying -2V to the first write word line WWL1 to charge the charge retention node 33 to 1V or 0V, and applying 0V to the first write word line WWL1.

A read operation of the first memory cell MC1 may include applying 0V to the first read word line RWL1, applying 0.5V to the first read bit line RBL1, applying 0V to the first write bit line WBL1 and applying 1V to the first write word line WWL1. In the read operation of the first memory cell MC1, on or off of the first read transistor RTr1 may be determined depending on whether the charging state of the charge retention node 33 is 1V or 0V.

A standby operation of the first memory cell MC1 may include applying 0V to the first write word line WWL1 to maintain both the first read transistor RTr1 and the first write transistor WTr1 in an off state.

Figure 5:
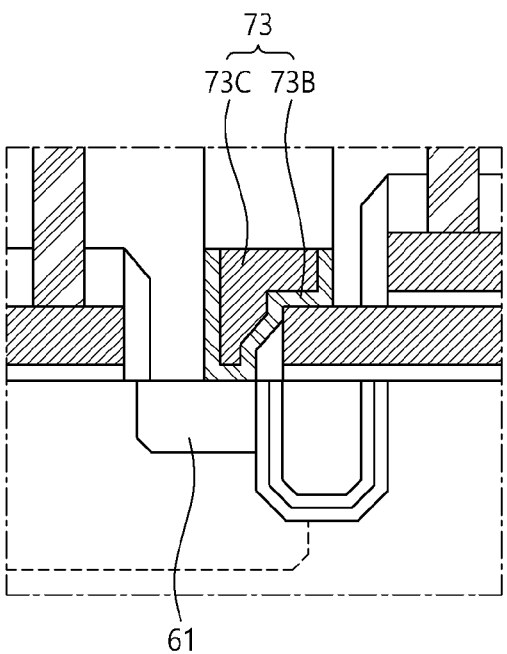
FIGS. 5 to 11 are partial views illustrating portions of FIG. 1.

Referring to FIG. 5, the interconnection 73 may include a barrier layer 73B and a conductive layer 73C. The conductive layer 73C may be formed on the barrier layer 73B. The barrier layer 73B may contact the third source/drain region 61. In an embodiment, the barrier layer 73B may include Ti, TiN, Ta, TaN or a combination thereof. The conductive layer 73C may include W, WN, Al, Cu, Co, Ru, Pt, Ag, Au, Zr, Mn, Sn, Ni, Ti, TiN, Ta, TaN or a combination thereof.

Figure 6:
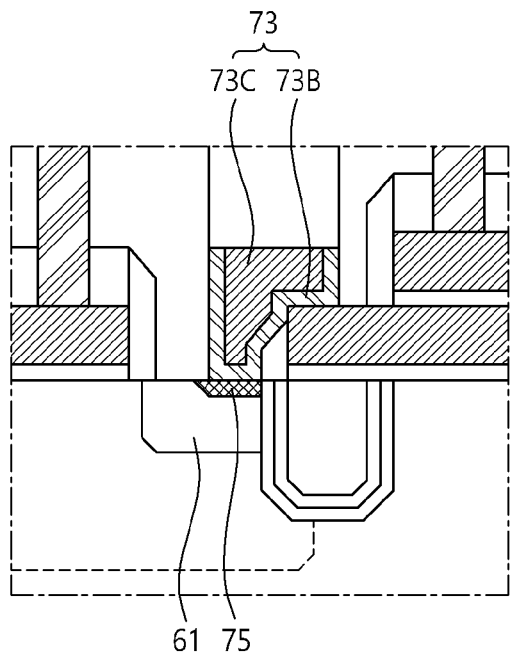

Referring to FIG. 6, a metal silicide layer 75 may be formed between the interconnection 73 and the third source/drain region 61. In an embodiment, the metal silicide layer 75 may include TiSi, TaSi, CoSi, NiSi or a combination thereof.

Figure 7:
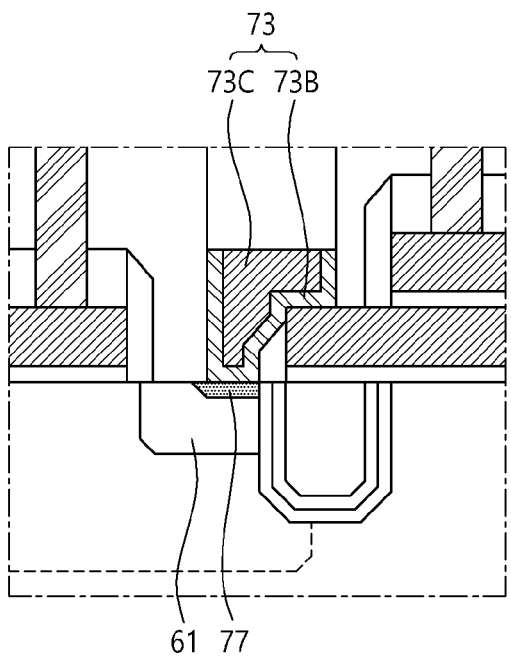

Referring to FIG. 7, a Schottky barrier layer 77 may be formed between the interconnection 73 and the third source/drain region 61. In an embodiment, the third source/drain region 61 may include a semiconductor layer, such as monocrystalline silicon, having P-type impurities of a first concentration. The Schottky barrier layer 77 may include a semiconductor layer, such as monocrystalline silicon, having P-type impurities of a second concentration that is lower than the concentration of P-type impurities in the third source/drain region 61. The interconnection 73 may include a metal that forms a Schottky bond with the Schottky barrier layer 77. The interconnection 73 may include TiN, W, Al or a combination thereof.

Figure 8:
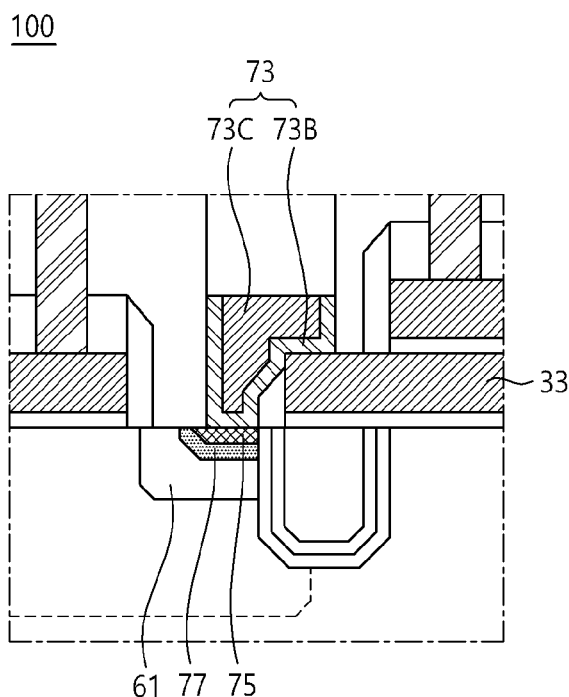

Referring to FIG. 8, both a metal silicide layer 75 and a Schottky barrier layer 77 may be formed between the interconnection 73 and the third source/drain region 61. The barrier layer 73B may contact upper and side surfaces of the charge retention node 33.

Figure 9:
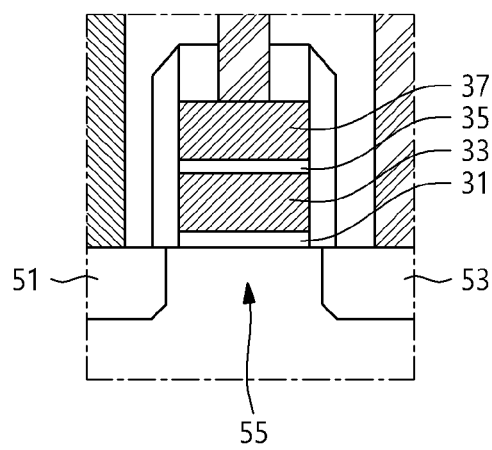

Referring to FIG. 9, the equivalent oxide thickness (EOT) of the channel dielectric layer 31 may be substantially the same as the equivalent oxide thickness (EOT) of the first gate dielectric layer 35. The equivalent oxide thickness (EOT) of each of the channel dielectric layer 31 and the first gate dielectric layer 35 may be minimized within a limit of a thickness that can prevent leakage current.

Figure 10:
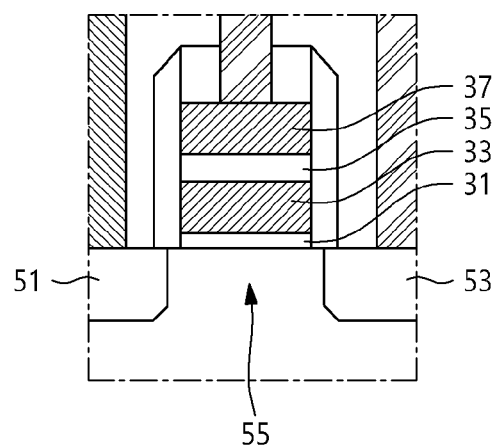

Referring to FIG. 10, the equivalent oxide thickness (EOT) of the first gate dielectric layer 35 may be larger than the equivalent oxide thickness (EOT) of the channel dielectric layer 31. For example, the equivalent oxide thickness (EOT) of the first gate dielectric layer 35 may be 1 to 2 times the equivalent oxide thickness (EOT) of the channel dielectric layer 31.

Figure 11:
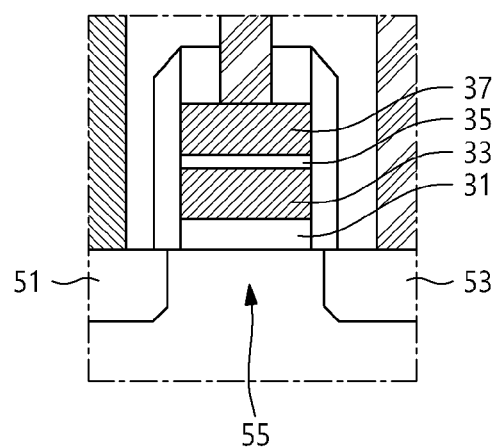

Referring to FIG. 11, the equivalent oxide thickness (EOT) of the channel dielectric layer 31 may be larger than the equivalent oxide thickness (EOT) of the first gate dielectric layer 35. For example, the equivalent oxide thickness (EOT) of the channel dielectric layer 31 may be 1 to 2 times the equivalent oxide thickness (EOT) of the first gate dielectric layer 35.

Referring to FIGS. 9 to 11, in an embodiment, the equivalent oxide thickness (EOT) of the first gate dielectric layer 35 may be 0.5 to 2 times the equivalent oxide thickness (EOT) of the channel dielectric layer 31.

Figure 12:
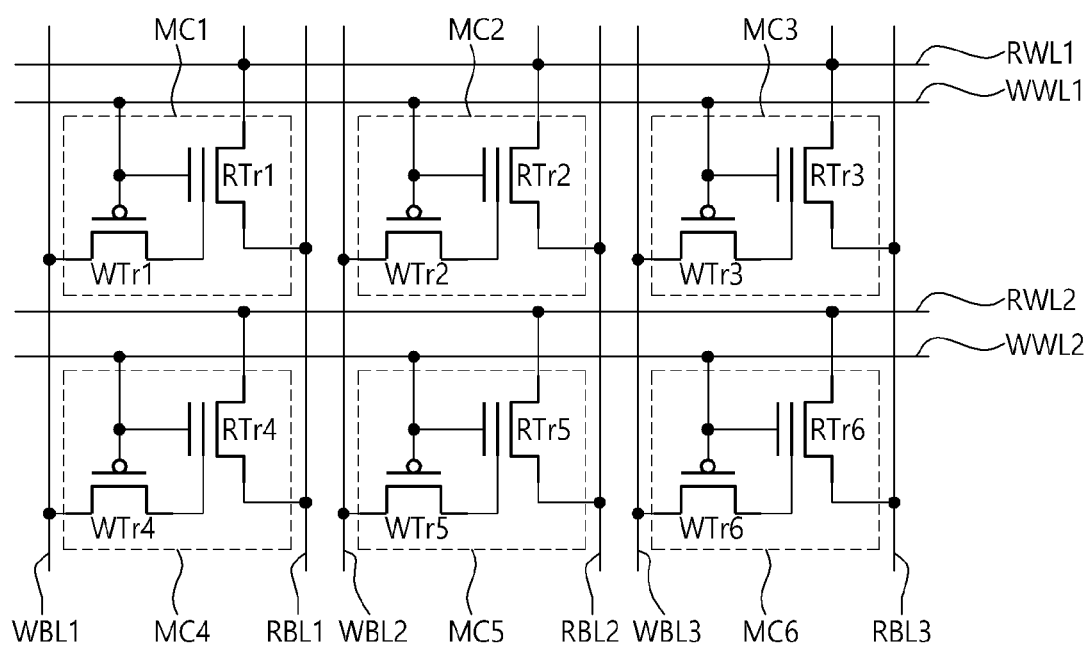
FIGS. 12, 14, 16, 18, 20 and 22 are equivalent circuit diagrams illustrating semiconductor devices according to embodiments of the disclosure.
Figure 13:
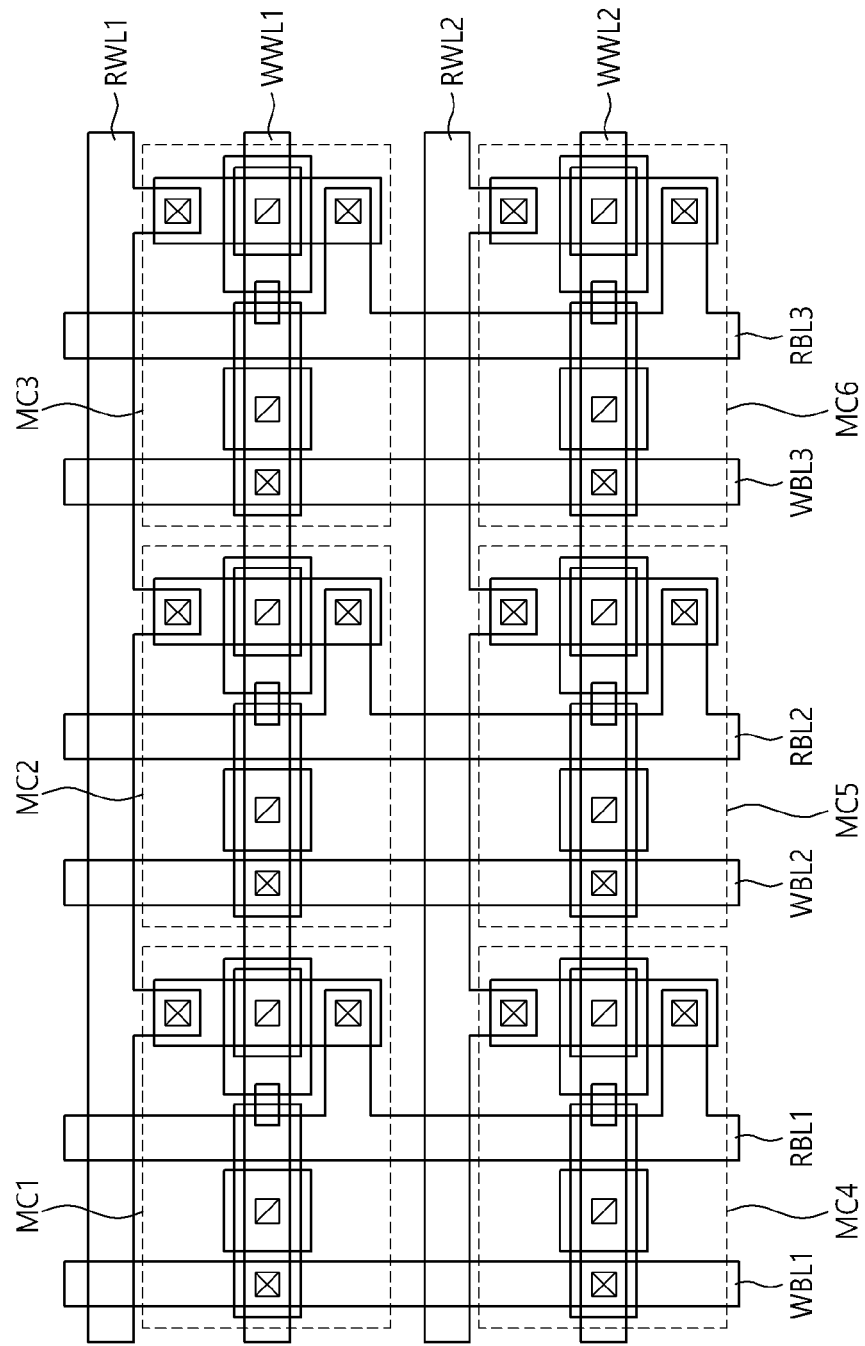
FIGS. 13, 15, 17, 19, 21 and 23 are layout diagrams illustrating semiconductor devices according to embodiments of the disclosure.

FIG. 12 is an equivalent circuit diagram illustrating a semiconductor device according to an embodiment of the disclosure, and FIG. 13 is a layout diagram corresponding to FIG. 12.

Referring to FIGS. 12 and 13, a first read word line RWL1, a first write word line WWL1, a second read word line RWL2 and a second write word line WWL2 may be disposed to be spaced apart from each other. Each of the first read word line RWL1, the first write word line WWL1, the second read word line RWL2 and the second write word line WWL2 may extend in a row direction. In an embodiment, the first read word line RWL1, the first write word line WWL1, the second read word line RWL2 and the second write word line WWL2 may be aligned in parallel to each other and sequentially arranged in a column direction.

A first write bit line WBL1, a first read bit line RBL1, a second write bit line WBL2, a second read bit line RBL2, a third write bit line WBL3 and a third read bit line RBL3 may be disposed to be spaced apart from each other. Each of the first write bit line WBL1, the first read bit line RBL1, the second write bit line WBL2, the second read bit line RBL2, the third write bit line WBL3 and the third read bit line RBL3 may extend in the column direction. In an embodiment, the first write bit line WBL1, the first read bit line RBL1, the second write bit line WBL2, the second read bit line RBL2, the third write bit line WBL3 and the third read bit line RBL3 may be aligned in parallel to each other and which are spaced apart from each other arranged in the row direction.

Each of the first write bit line WBL1, the first read bit line RBL1, the second write bit line WBL2, the second read bit line RBL2, the third write bit line WBL3 and the third read bit line RBL3 may intersect with the first read word line RWL1, the first write word line WWL1, the second read word line RWL2 and the second write word line WWL2. First to sixth memory cells MC1 to MC6 may be disposed adjacent to intersections of the first write bit line WBL1, the first read bit line RBL1, the second write bit line WBL2, the second read bit line RBL2, the third write bit line WBL3 and the third read bit line RBL3 with the first read word line RWL1, the first write word line WWL1, the second read word line RWL2 and the second write word line WWL2.

The first to sixth memory cells MC1 to MC6 may include first to sixth read transistors RTr1 to RTr6 and first to sixth write transistors WTr1 to WTr6, respectively. The first memory cell MC1 may include a configuration similar to that described above with reference to FIGS. 1 to 11. For example, the first memory cell MC1 may include the first read transistor RTr1 and the first write transistor WTr1. Each of the second to sixth memory cells MC2 to MC6 may include a configuration similar to the first memory cell MC1 described above with reference to FIGS. 1 to 11.

Figure 14:
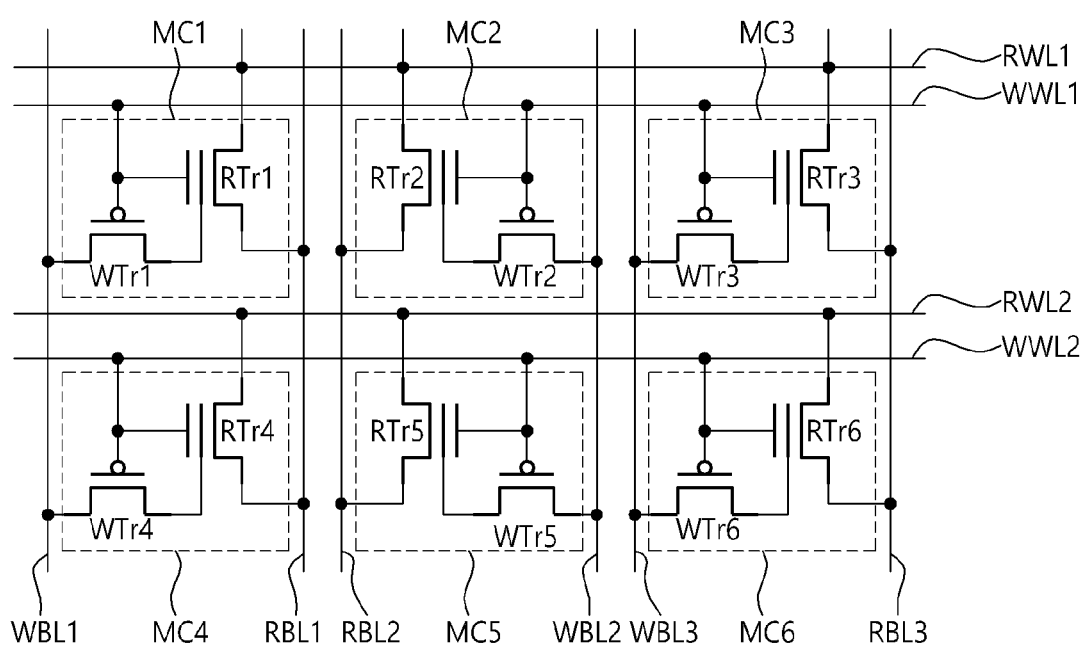
Figure 15:
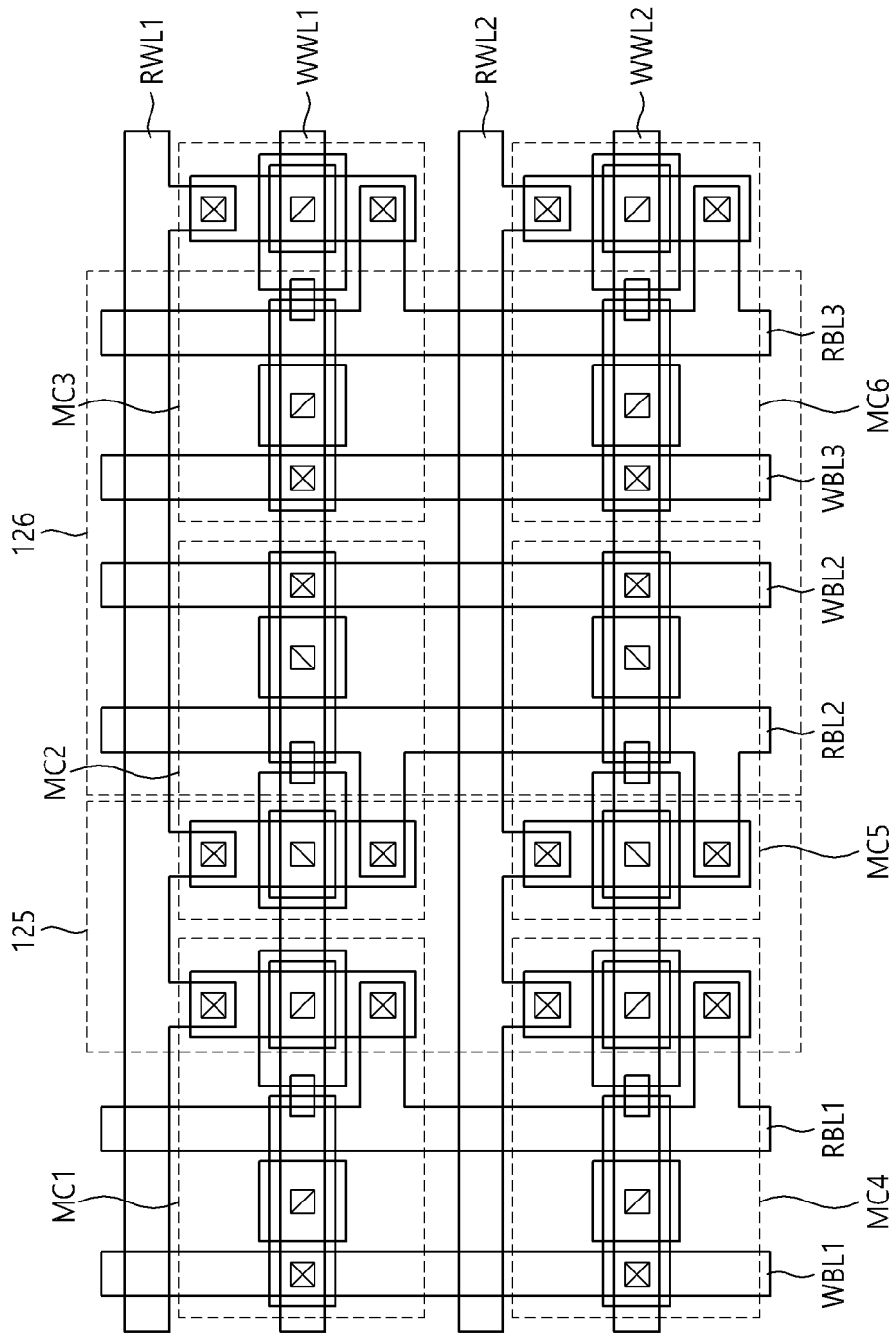

FIG. 14 is an equivalent circuit diagram illustrating a semiconductor device according to an embodiment of the disclosure, and FIG. 15 is a layout diagram corresponding to FIG. 14.

Referring to FIGS. 14 and 15, in an embodiment, a first write bit line WBL1, a first read bit line RBL1, a second read bit line RBL2, a second write bit line WBL2, a third write bit line WBL3 and a third read bit line RBL3 may be sequentially arranged and aligned parallel to each other in a row direction. Each of the first write bit line WBL1, the first read bit line RBL1, the second read bit line RBL2, the second write bit line WBL2, the third write bit line WBL3 and the third read bit line RBL3 may intersect with a first read word line RWL1, a first write word line WWL1, a second read word line RWL2 and a second write word line WWL2.

First to sixth memory cells MC1 to MC6 may be disposed adjacent to intersections of the first write bit line WBL1, the first read bit line RBL1, the second read bit line RBL2, the second write bit line WBL2, the third write bit line WBL3 and the third read bit line RBL3 with the first read word line RWL1, the first write word line WWL1, the second read word line RWL2 and the second write word line WWL2. The first to sixth memory cells MC1 to MC6 may include first to sixth read transistors RTr1 to RTr6 and first to sixth write transistors WTr1 to WTr6, respectively. The first memory cell MC1 may include a configuration similar to that described above with reference to FIGS. 1 to 11. The first to third memory cells MC1 to MC3 may be sequentially arranged in the row direction and aligned in the column direction. The fourth to sixth memory cells MC4 to MC6 may be disposed in the column direction of the first to third memory cells MC1 to MC3, respectively. The fourth to sixth memory cells MC4 to MC6 may be sequentially arranged in the row direction and aligned in the column direction.

The second read transistor RTr2 of the second memory cell MC2 may be disposed adjacent to the first read transistor RTr1 of the first memory cell MC1. The second write transistor WTr2 of the second memory cell MC2 may be disposed adjacent to the third write transistor WTr3 of the third memory cell MC3. The fifth read transistor RTr5 of the fifth memory cell MC5 may be disposed adjacent to the fourth read transistor RTr4 of the fourth memory cell MC4. The fifth write transistor WTr5 of the fifth memory cell MC5 may be disposed adjacent to the sixth write transistor WTr6 of the sixth memory cell MC6.

The fourth read transistor RTr4 and the fifth read transistor RTr5 may be disposed in the column direction of the first read transistor RTr1 and the second read transistor RTr2, respectively. The fifth write transistor WTr5 and the sixth write transistor WTr6 may be disposed in the column direction of the second write transistor WTr2 and the third write transistor WTr3, respectively.

The first read transistor RTr1, the second read transistor RTr2, the fourth read transistor RTr4 and the fifth read transistor RTr5 may be disposed in a first conductivity type region 125. The second write transistor WTr2, the third write transistor WTr3, the fifth write transistor WTr5 and the sixth write transistor WTr6 may be disposed in a second conductivity type region 126. The second conductivity type region 126 may be disposed adjacent to the first conductivity type region 125 in the row direction. A plurality of first conductivity type regions 125 and a plurality of second conductivity type regions 126 may be alternately and repeatedly arranged in the row direction. In an embodiment, the first conductivity type region 125 may include NMOS transistors, and the second conductivity type region 126 may include PMOS transistors.

Figure 16:
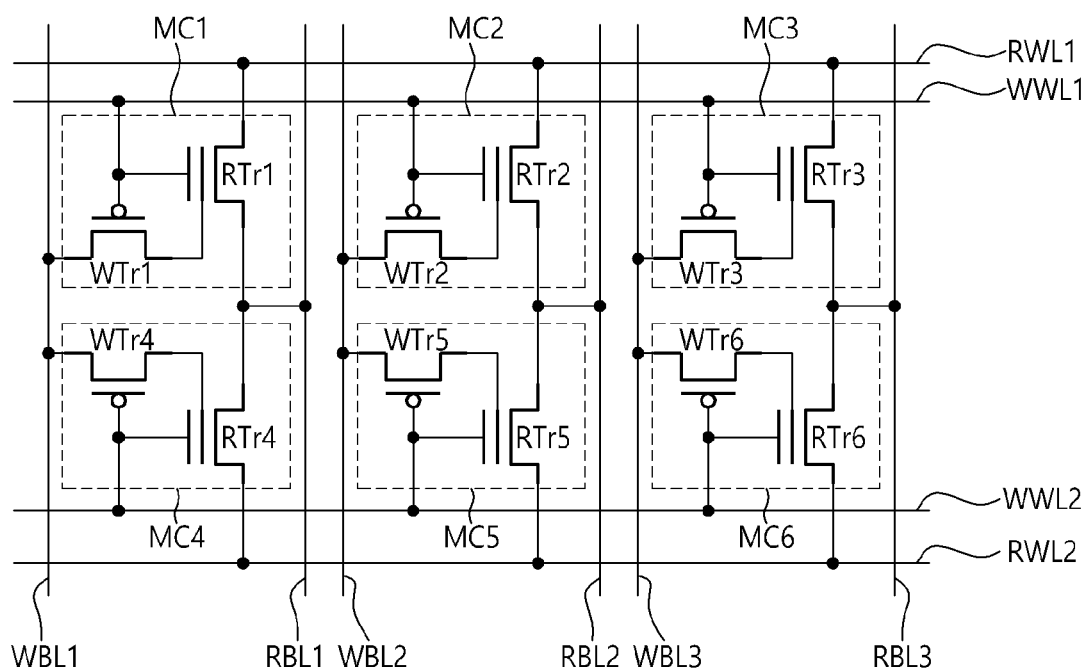
Figure 17:
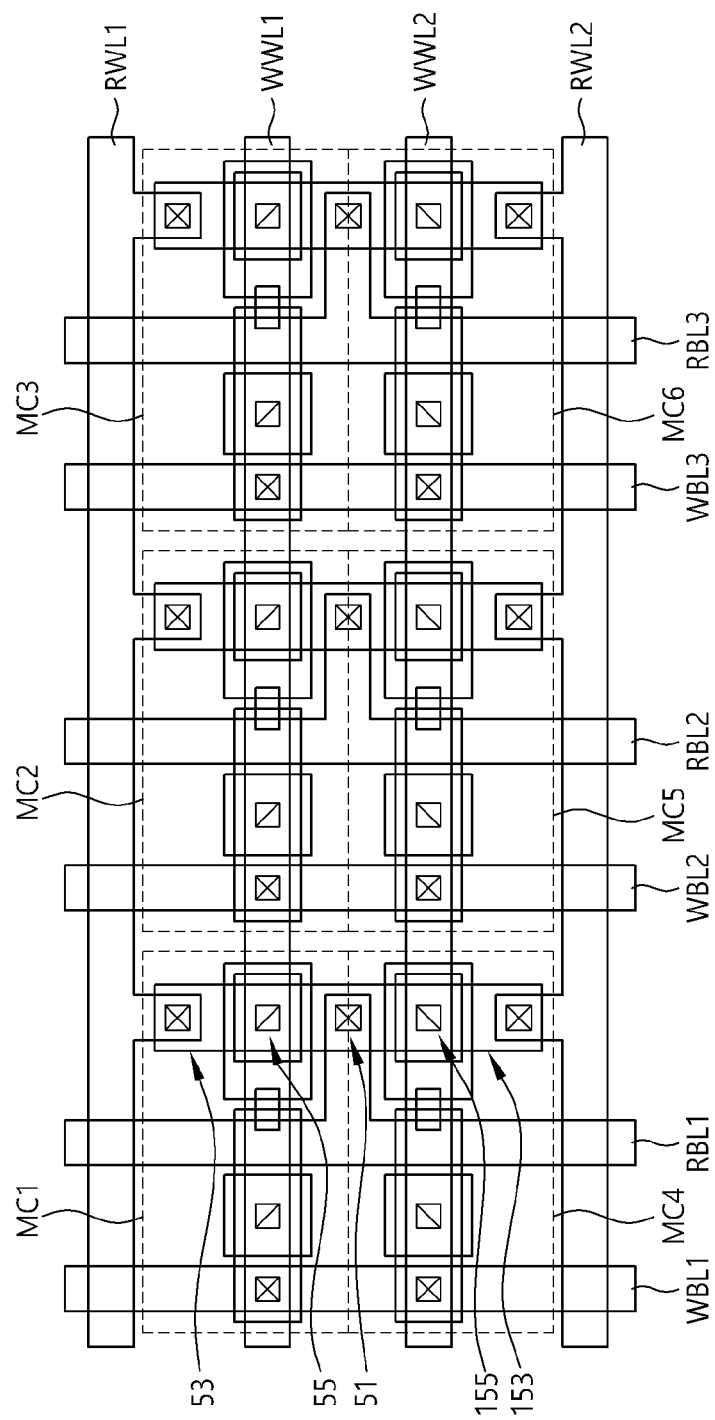

FIG. 16 is an equivalent circuit diagram illustrating a semiconductor device according to an embodiment of the disclosure, and FIG. 17 is a layout diagram corresponding to FIG. 16.

Referring to FIGS. 16 and 17, in an embodiment, a first read word line RWL1, a first write word line WWL1, a second write word line WWL2 and a second read word line RWL2 may be sequentially arranged in a column direction, and aligned parallel to each other while extending in the row direction. A first write bit line WBL1, a first read bit line RBL1, a second write bit line WBL2, a second read bit line RBL2, a third write bit line WBL3 and a third read bit line RBL3 may be sequentially arranged in a row direction, and aligned parallel to each other while extending in the column direction.

First to sixth memory cells MC1 to MC6 may be disposed adjacent to intersections of the first write bit line WBL1, the first read bit line RBL1, the second write bit line WBL2, the second read bit line RBL2, the third write bit line WBL3 and the third read bit line RBL3 with the first read word line RWL1, the first write word line WWL1, the second write word line WWL2 and the second read word line RWL2.

One of source and drain regions of a first read transistor RTr1 may be shared with a fourth read transistor RTr4, and may be connected to the first read bit line RBL1. One of source and drain regions of a second read transistor RTr2 may be shared with a fifth read transistor RTr5, and may be connected to the second read bit line RBL2. One of source and drain regions of a third read transistor RTr3 may be shared with a sixth read transistor RTr6, and may be connected to the third read bit line RBL3.

For example, a first channel region 55 may be disposed between a first source/drain region 51 and a second source/drain region 53 of the first read transistor RTr1. The first source/drain region 51 may contact a third channel region 155 of the fourth read transistor RTr4. The fourth read transistor RTr4 may include the third channel region 155 between the first source/drain region 51 and a fifth source/drain region 153. The first source/drain region 51 may be disposed between the first channel region 55 and the third channel region 155. The first source/drain region 51 may contact the first channel region 55 and the third channel region 155. The first source/drain region 51 may be connected to the first read bit line RBL1.

Figure 18:
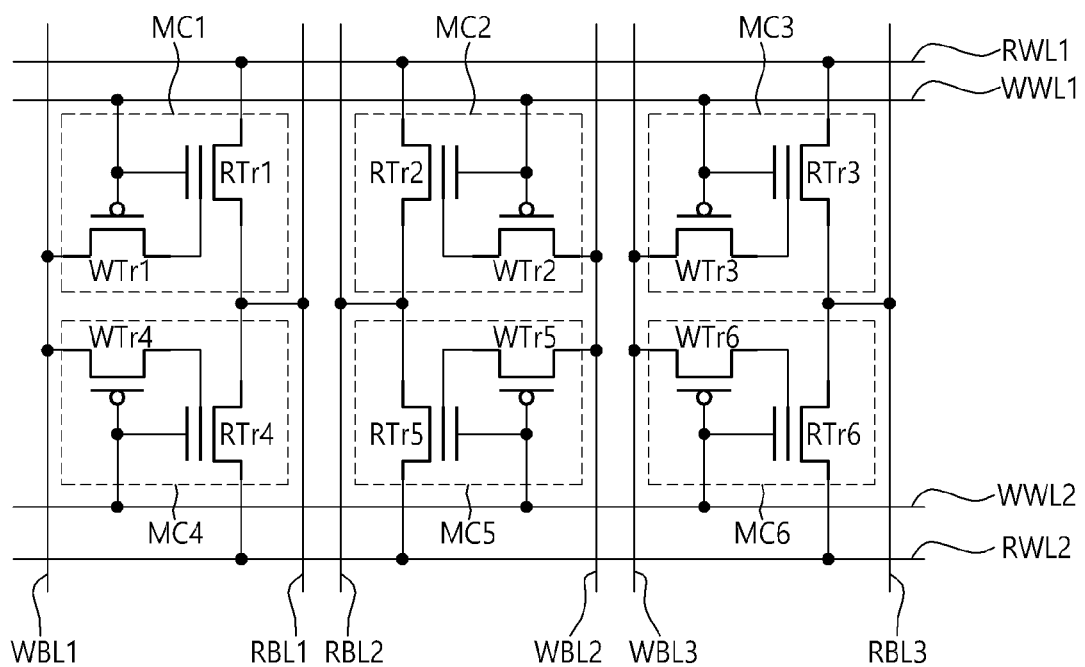
Figure 19:
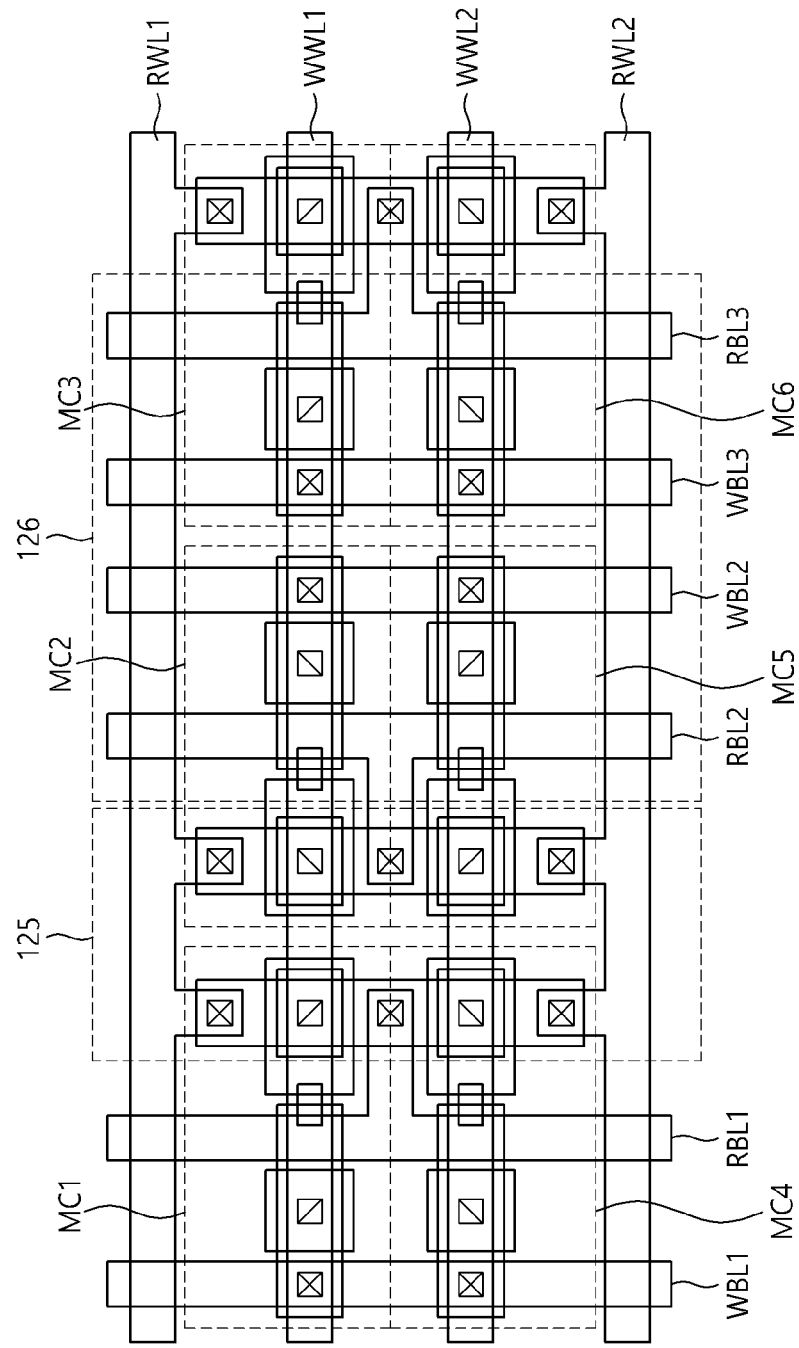

FIG. 18 is an equivalent circuit diagram illustrating a semiconductor device according to an embodiment of the disclosure, and FIG. 19 is a layout diagram corresponding to FIG. 18.

Referring to FIGS. 18 and 19, in an embodiment, a first read word line RWL1, a first write word line WWL1, a second write word line WWL2 and a second read word line RWL2 may be sequentially arranged in a column direction and aligned parallel to each other while extending in a row direction. A first write bit line WBL1, a first read bit line RBL1, a second read bit line RBL2, a second write bit line WBL2, a third write bit line WBL3 and a third read bit line RBL3 may be sequentially arranged in a row direction and aligned parallel to each other while extending in a column direction.

One of source and drain regions of a first read transistor RTr1 may be shared with a fourth read transistor RTr4, and may be connected to the first read bit line RBL1. One of source and drain regions of a second read transistor RTr2 may be shared with a fifth read transistor RTr5, and may be connected to the second read bit line RBL2. The first read transistor RTr1 may be disposed adjacent to a second read transistor RTr2, and the fourth read transistor RTr4 may be disposed adjacent to a fifth read transistor RTr5. The first read transistor RTr1, the second read transistor RTr2, the fourth read transistor RTr4 and the fifth read transistor RTr5 may be disposed in a first conductivity type region 125.

A second write transistor WTr2 may be disposed adjacent to a third write transistor WTr3, and a fifth write transistor WTr5 may be disposed adjacent to a sixth write transistor WTr6. The second write transistor WTr2, the third write transistor WTr3, the fifth write transistor WTr5 and the sixth write transistor WTr6 may be disposed in a second conductivity type region 126.

Figure 20:
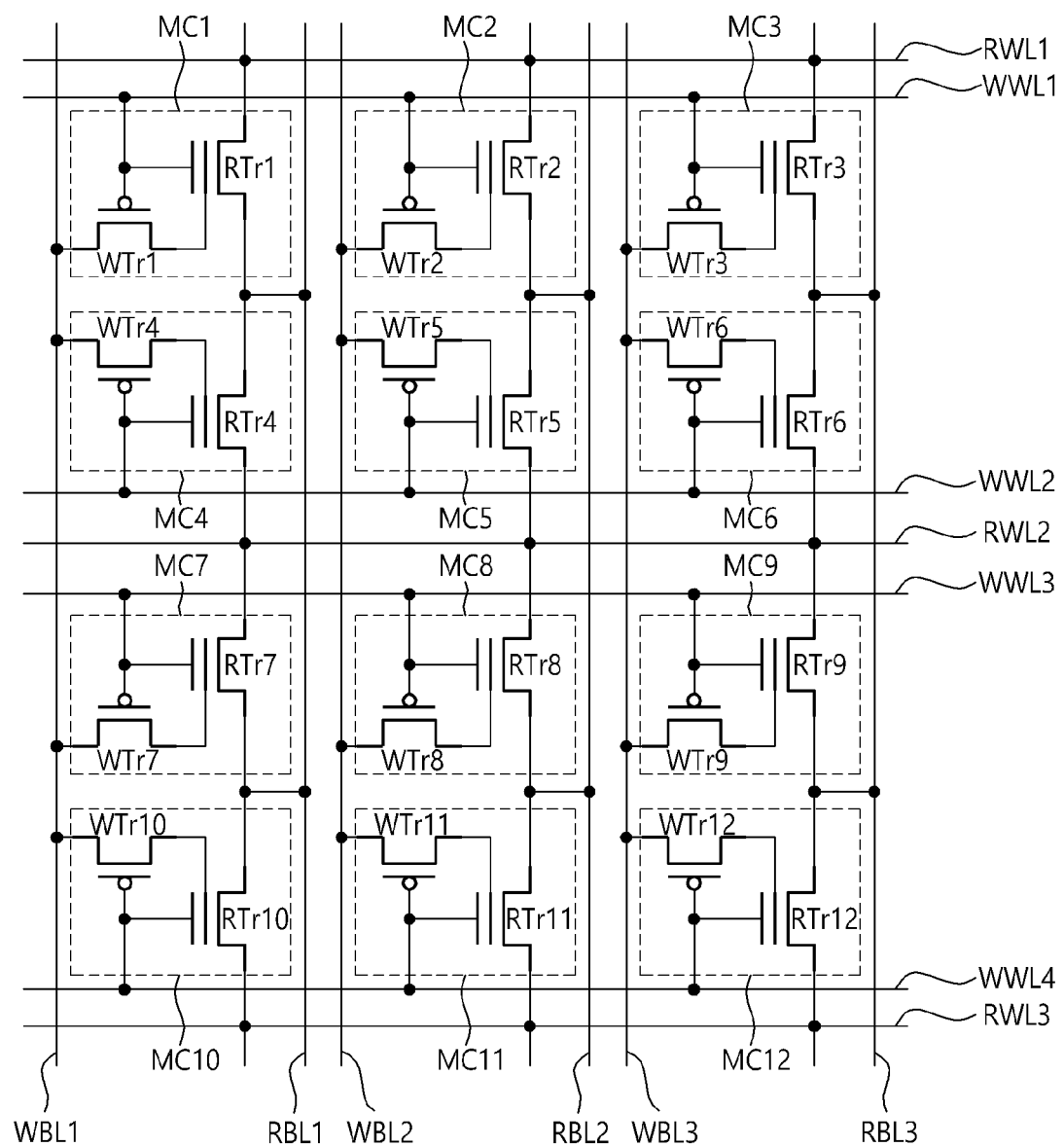
Figure 21:
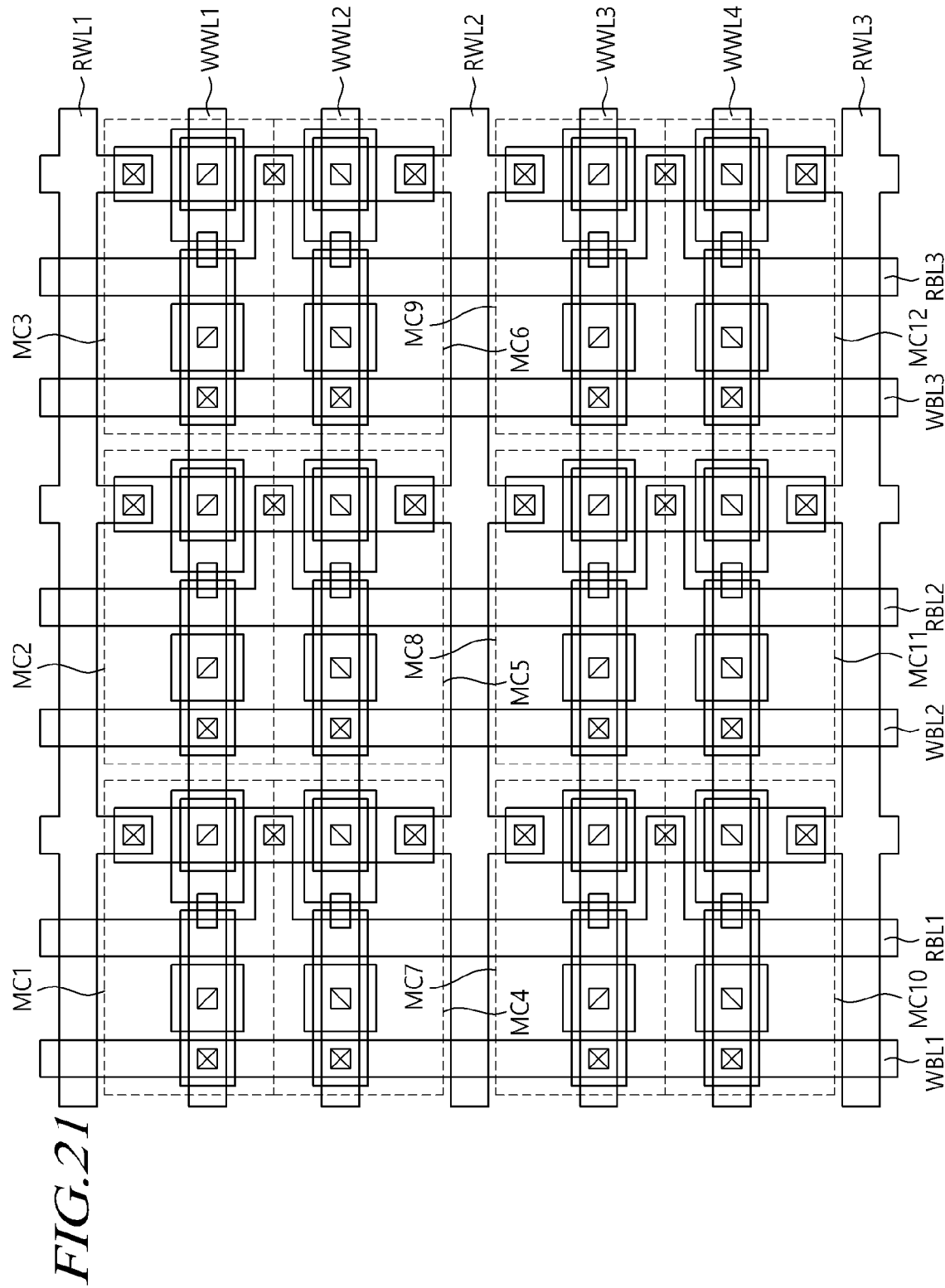

FIG. 20 is an equivalent circuit diagram illustrating a semiconductor device according to an embodiment of the disclosure, and FIG. 21 is a layout diagram corresponding to FIG. 20.

Referring to FIGS. 20 and 21, in an embodiment, a first read word line RWL1, a first write word line WWL1, a second write word line WWL2, a second read word line RWL2, a third write word line WWL3, a fourth write word line WWL4 and a third read word line RWL3 may be sequentially arranged in a column direction and aligned parallel to each other while extending in a row direction. A first write bit line WBL1, a first read bit line RBL1, a second write bit line WBL2, a second read bit line RBL2, a third write bit line WBL3 and a third read bit line RBL3 may be sequentially arranged in the row direction and aligned parallel to each other while extending in a column direction.

First to twelfth memory cells MC1 to MC12 may be disposed adjacent to intersections of the first write bit line WBL1, the first read bit line RBL1, the second write bit line WBL2, the second read bit line RBL2, the third write bit line WBL3 and the third read bit line RBL3 with the first read word line RWL1, the first write word line WWL1, the second write word line WWL2, the second read word line RWL2, the third write word line WWL3, the fourth write word line WWL4 and the third read word line RWL3.

One of source and drain regions of a fourth read transistor RTr4 and one of source and drain regions of a seventh read transistor RTr7 may be connected to the second read word line RWL2. One of source and drain regions of a fifth read transistor RTr5 and one of source and drain regions of an eighth read transistor RTr8 may be connected to the second read word line RWL2. One of source and drain regions of a sixth read transistor RTr6 and one of source and drain regions of a ninth read transistor RTr9 may be connected to the second read word line RWL2.

Figure 22:
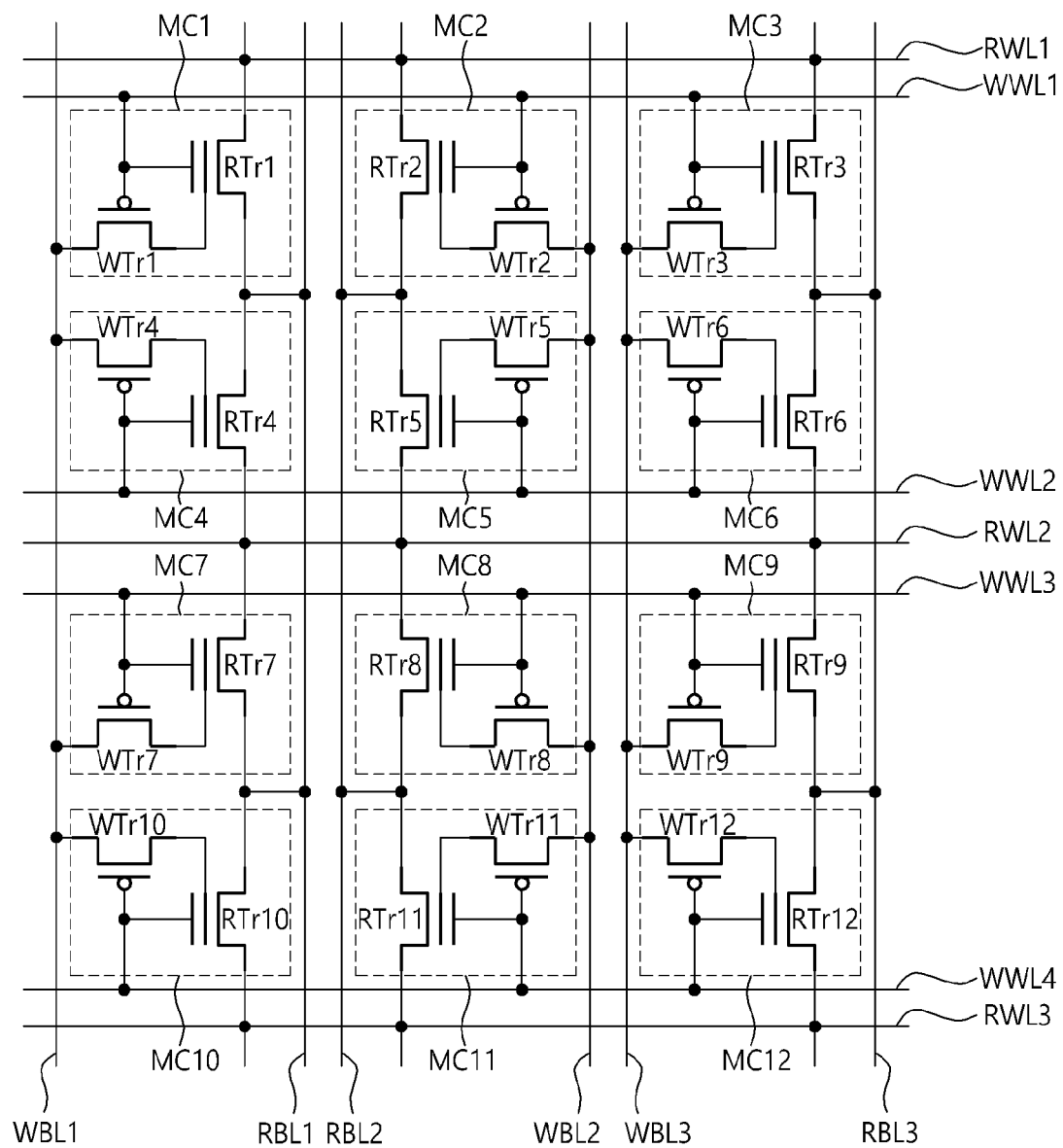
Figure 23:
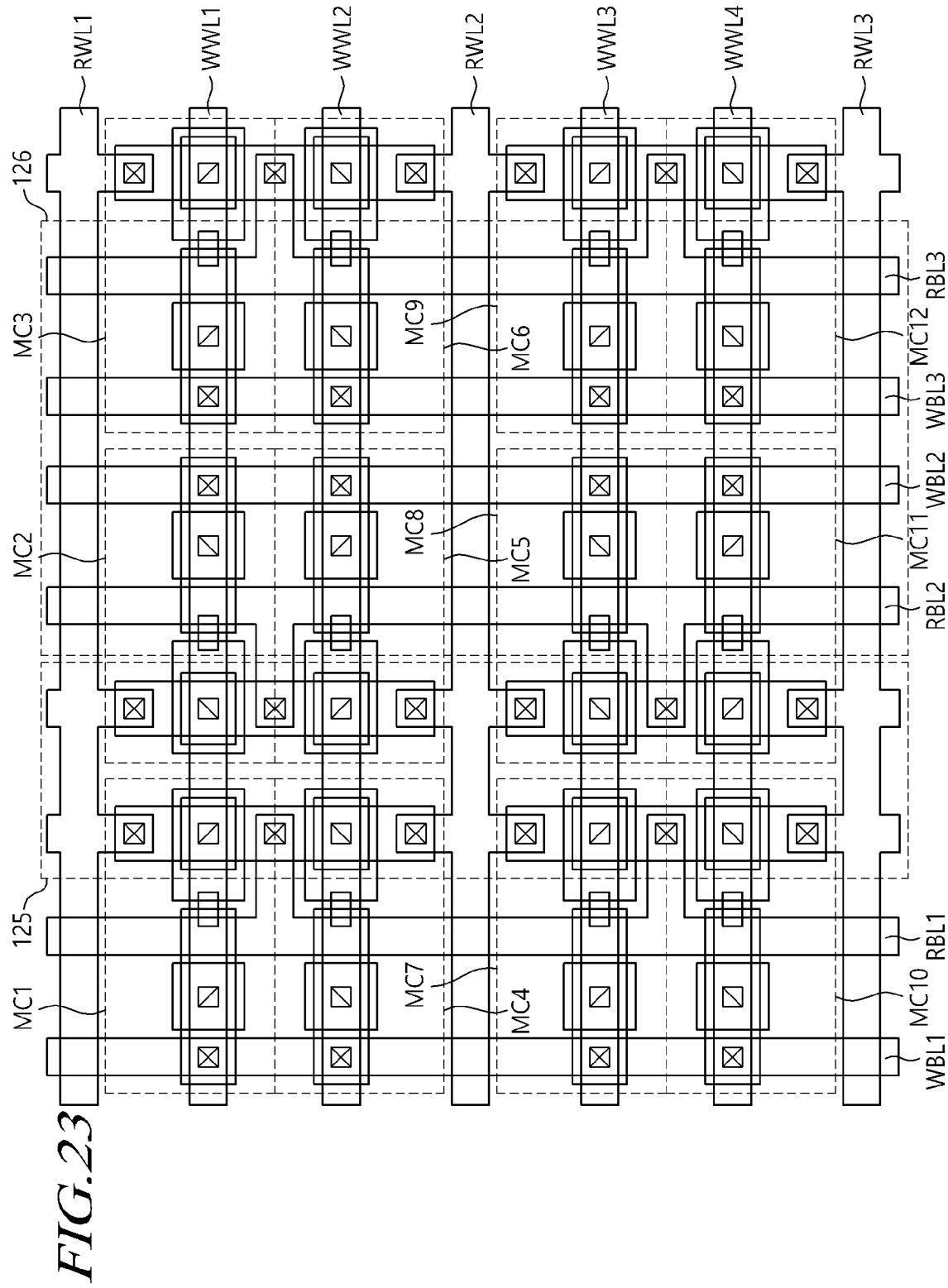

FIG. 22 is an equivalent circuit diagram illustrating a semiconductor device according to an embodiment of the disclosure, and FIG. 23 is a layout diagram corresponding to FIG. 22.

Referring to FIGS. 22 and 23, in an embodiment, a first read word line RWL1, a first write word line WWL1, a second write word line WWL2, a second read word line RWL2, a third write word line WWL3, a fourth write word line WWL4 and a third read word line RWL3 may be sequentially arranged in a column direction and aligned parallel to each other while extending in a row direction. A first write bit line WBL1, a first read bit line RBL1, a second read bit line RBL2, a second write bit line WBL2, a third write bit line WBL3 and a third read bit line RBL3 may be sequentially aligned parallel to each other in a row direction.

First to twelfth memory cells MC1 to MC12 may be disposed adjacent to intersections of the first write bit line WBL1, the first read bit line RBL1, the second read bit line RBL2, the second write bit line WBL2, the third write bit line WBL3 and the third read bit line RBL3 with the first read word line RWL1, the first write word line WWL1, the second write word line WWL2, the second read word line RWL2, the third write word line WWL3, the fourth write word line WWL4 and the third read word line RWL3.

A first read transistor RTr1 may be disposed adjacent to a second read transistor RTr2, a fourth read transistor RTr4 may be disposed adjacent to a fifth read transistor RTr5, a seventh read transistor RTr7 may be disposed adjacent to an eighth read transistor RTr8, and a tenth read transistor RTr10 may be disposed adjacent to an eleventh read transistor RTr11. The first read transistor RTr1, the second read transistor RTr2, the fourth read transistor RTr4, the fifth read transistor RTr5, the seventh read transistor RTr7, the eighth read transistor RTr8, the tenth read transistor RTr10 and the eleventh read transistor RTr11 may be disposed in a first conductivity type region 125.

A second write transistor WTr2 may be disposed adjacent to a third write transistor WTr3, a fifth write transistor WTr5 may be disposed adjacent to a sixth write transistor WTr6, an eighth write transistor WTr8 may be disposed adjacent to a ninth write transistor WTr9, and an eleventh write transistor WTr11 may be disposed adjacent to a twelfth write transistor WTr12. The second write transistor WTr2, the third write transistor WTr3, the fifth write transistor WTr5, the sixth write transistor WTr6, the eighth write transistor WTr8, the ninth write transistor WTr9, the eleventh write transistor WTr11 and the twelfth write transistor WTr12 may be disposed in a second conductivity type region 126.

One of source and drain regions of the fourth read transistor RTr4 and one of source and drain regions of the seventh read transistor RTr7 may be connected to the second read word line RWL2. One of source and drain regions of the fifth read transistor RTr5 and one of source and drain regions of the eighth read transistor RTr8 may be connected to the second read word line RWL2. One of source and drain regions of a sixth read transistor RTr6 and one of source and drain regions of a ninth read transistor RTr9 may be connected to the second read word line RWL2.

FIGS. 24 to 31 are cross-sectional views illustrating a method for forming a semiconductor device according to embodiments of the disclosure. FIGS. 24 to 31 may be cross-sectional views taken along the lines I-I' and II-II' of FIG. 3.

Figure 24:
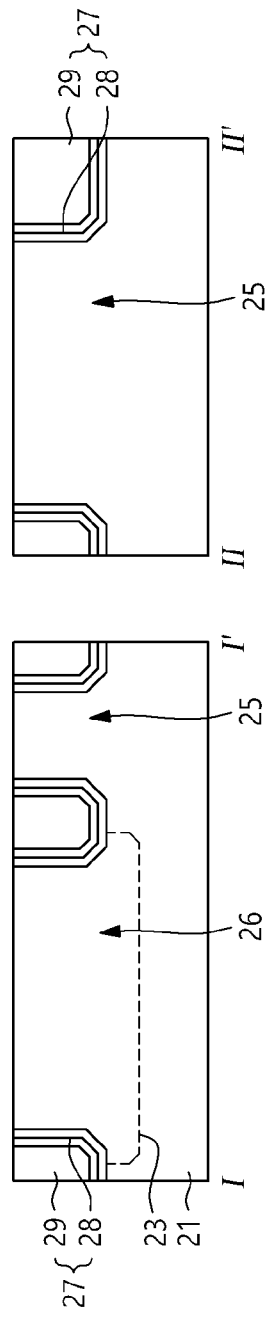

Referring to FIGS. 3 and 24, a first well 23 may be formed in a substrate 21. An isolation layer 27 which delimits a first active region 25 and a second active region 26 may be formed in the substrate 21.

The substrate 21 may include a semiconductor substrate such as a silicon wafer or a silicon on insulator (SOI) wafer. The substrate 21 may include a group III-V semiconductor substrate, for example, a compound semiconductor substrate such as GaAs. The substrate 21 may include monocrystalline silicon, polysilicon, amorphous silicon, monocrystalline silicon germanium, polycrystalline silicon germanium, carbon-doped silicon, or a combination thereof.

The substrate 21 may include first conductivity type impurities, and the first well 23 may include second conductivity type impurities. Each of the first conductivity type impurities and the second conductivity type impurities may include P-type impurities or N-type impurities. P-type impurities may include B, BF, BF2 or a combination thereof, and N-type impurities may include P, As or a combination thereof. The second conductivity type impurities may include conductivity type impurities different from the first conductivity type impurities.

In an embodiment, the first conductivity type impurities may include P-type impurities, and the second conductivity type impurities may include N-type impurities. The substrate 21 may include a semiconductor layer such as a monocrystalline silicon layer with P-type impurities, and the first well 23 may include a semiconductor layer such as a monocrystalline silicon layer with N-type impurities. For example, the first well 23 may correspond to an N-well.

The first active region 25, the second active region 26 and the isolation layer 27 may be formed using a trench isolation technology such as shallow trench isolation (STI). The second active region 26 may be spaced apart from the first active region 25. The first active region 25 may be delimited in the substrate 21 by the isolation layer 27. The second active region 26 may be delimited in the first well 23 by the isolation layer 27. In an embodiment, the first active region 25 may include a semiconductor layer such as monocrystalline silicon with P-type impurities. The second active region 26 may include a semiconductor layer such as monocrystalline silicon with N-type impurities.

The isolation layer 27 may include a single layer or multiple layers. The isolation layer 27 may include at least two selected from the group consisting of Si, O, N, C and H. The isolation layer 27 may include silicon oxide, silicon nitride, silicon oxynitride, low-k dielectric, high-k dielectric or a combination thereof.

In an embodiment, the isolation layer 27 may include a first insulating layer 28 and a second insulating layer 29. The first insulating layer 28 may contact the side surfaces of the first active region 25 and the second active region 26. The first insulating layer 28 may include an oxide liner, a nitride liner or a combination thereof. The second insulating layer 29 may be formed on the first insulating layer 28. The second insulating layer 29 may include silicon oxide.

Figure 25:
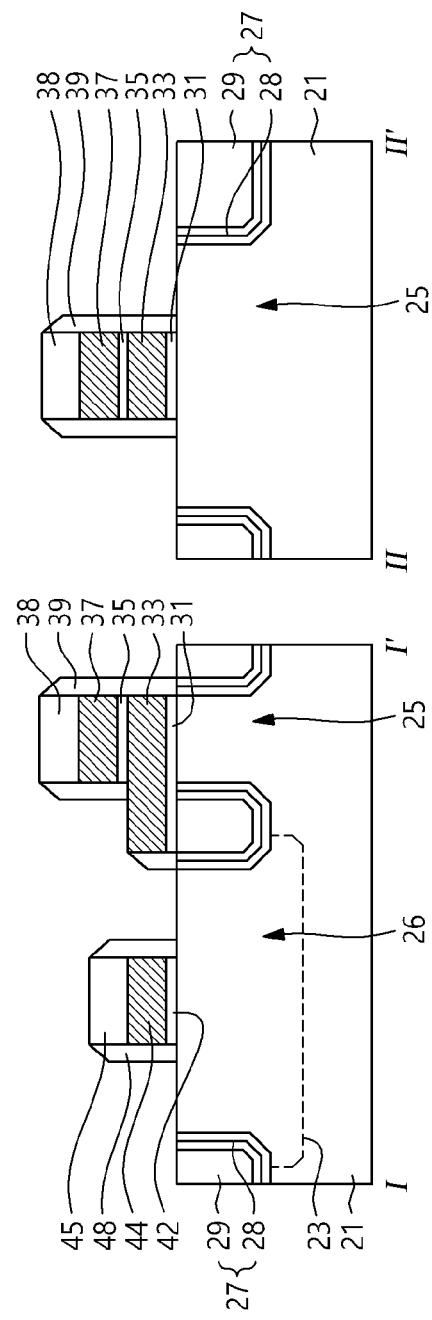

Referring to FIGS. 3 and 25, by using a plurality of thin film forming processes and a plurality of patterning processes, a channel dielectric layer 31, a charge retention node 33, a first gate dielectric layer 35, a first gate electrode 37, a first capping pattern 38, a first gate spacer 39, a second gate dielectric layer 42, a second gate electrode 44, a second capping pattern 45 and a second gate spacer 48 may be formed on the substrate 21, which includes the first active region 25, the second active region 26 and the isolation layer 27.

The charge retention node 33 may be formed over the first active region 25, and may extend onto the isolation layer 27, which is adjacent to the second active region 26. The channel dielectric layer 31 may be formed between the first active region 25 and the charge retention node 33, and may extend between the isolation layer 27 and the charge retention node 33.

The first gate electrode 37 may be formed over the charge retention node 33, which is formed over the first active region 25. The first gate dielectric layer 35 may be formed between the charge retention node 33 and the first gate electrode 37. The first capping pattern 38 may be formed on the first gate electrode 37. At least one side surface of each of the first capping pattern 38, the first gate electrode 37, the first gate dielectric layer 35 and the charge retention node 33 may be aligned on substantially the same plane. The at least one side surface of each of the first capping pattern 38, the first gate electrode 37, the first gate dielectric layer 35 and the charge retention node 33 may be vertically aligned. The first gate spacer 39 may be formed on the side surfaces of the first capping pattern 38, the first gate electrode 37, the first gate dielectric layer 35, the charge retention node 33 and the channel dielectric layer 31.

The second gate electrode 44 may be formed over the second active region 26. The second gate dielectric layer 42 may be formed between the second active region 26 and the second gate electrode 44. The second capping pattern 45 may be formed on the second gate electrode 44. The second gate spacer 48 may be formed on the side surfaces of the second capping pattern 45, the second gate electrode 44 and the second gate dielectric layer 42.

Each of the charge retention node 33, the first gate electrode 37 and the second gate electrode 44 may include a single layer or multiple layers. Each of the charge retention node 33, the first gate electrode 37 and the second gate electrode 44 may include a conductive material such as metal, metal oxide, metal nitride, metal silicide, polysilicon, conductive carbon or a combination thereof. The charge retention node 33, the first gate electrode 37 and the second gate electrode 44 may include different materials.

Each of the channel dielectric layer 31, the first gate dielectric layer 35 and the second gate dielectric layer 42 may include a single layer or multiple layers. Each of the channel dielectric layer 31, the first gate dielectric layer 35 and the second gate dielectric layer 42 may include silicon oxide, silicon nitride, silicon oxynitride, high-k dielectric or a combination thereof. The channel dielectric layer 31, the first gate dielectric layer 35 and the second gate dielectric layer 42 may include different materials.

Each of the first capping pattern 38, the first gate spacer 39, the second capping pattern 45 and the second gate spacer 48 may include a single layer or multiple layers. Each of the first capping pattern 38, the first gate spacer 39, the second capping pattern 45 and the second gate spacer 48 may include silicon oxide, silicon nitride, silicon oxynitride, low-k dielectric, high-k dielectric or a combination thereof.

Referring to FIGS. 3 and 26, a first mask pattern 50, which covers the second active region 26 and exposes the first active region 25, may be formed on the substrate 21. A first source/drain region 51 and a second source/drain region 53 may be formed in the first active region 25 by using the first mask pattern 50, the first capping pattern 38, the first gate spacer 39 and the first gate electrode 37 as an ion implantation mask. The first source/drain region 51 and the second source/drain region 53 may be formed adjacent to the outside of the first capping pattern 38, the first gate spacer 39 and the first gate electrode 37. A first channel region 55 may be delimited in the first active region 25 between the first source/drain region 51 and the second source/drain region 53. The first channel region 55 may be aligned below the first gate electrode 37. The first source/drain region 51 and the second source/drain region 53 may include impurities of a conductivity type different from the first channel region 55.

In an embodiment, the first channel region 55 may include a semiconductor layer such as monocrystalline silicon with P-type impurities. The first source/drain region 51 and the second source/drain region 53 may include a semiconductor layer such as monocrystalline silicon with N-type impurities.

Referring to FIGS. 3 and 27, the first mask pattern 50 may be removed. A second mask pattern 60, which covers the first active region 25 and exposes the second active region 26, may be formed on the substrate 21.

A third source/drain region 61 and a fourth source/drain region 63 may be formed in the second active region 26 by using the second mask pattern 60, the second capping pattern 45, the second gate spacer 48 and the second gate electrode 44 as an ion implantation mask. The third source/drain region 61 and the fourth source/drain region 63 may be formed adjacent to the outside of the second capping pattern 45, the second gate spacer 48 and the second gate electrode 44. A second channel region 66 may be delimited in the second active region 26 between the third source/drain region 61 and the fourth source/drain region 63. The second channel region 66 may be aligned below the second gate electrode 44. The third source/drain region 61 and the fourth source/drain region 63 may include impurities of a conductivity type different from the second channel region 66.

In an embodiment, the second channel region 66 may include a semiconductor layer such as monocrystalline silicon with N-type impurities. The third source/drain region 61 and the fourth source/drain region 63 may include a semiconductor layer such as monocrystalline silicon with P-type impurities.

Referring to FIGS. 3 and 28, the second mask pattern 60 may be removed, and a first interlayer insulating layer 72 may be formed on the substrate 21. The first interlayer insulating layer 72 may include silicon oxide, silicon nitride, silicon oxynitride, low-k dielectric, high-k dielectric or a combination thereof.

Referring to FIGS. 3 and 29, by patterning the first interlayer insulating layer 72, an opening 72H, which exposes the third source/drain region 61 and the charge retention node 33, may be formed. The upper and side surfaces of the charge retention node 33 may be partially exposed in the opening 72H. In an embodiment, in the opening 72H, a portion or the entirety of the first gate spacer 39 may be removed. In the opening 72H, the first gate spacer 39 may be partially preserved on a side surface of the charge retention node 33. In the opening 72H, the first gate spacer 39 may be removed to expose a portion of the side surface of the charge retention node 33.

Figure 30:
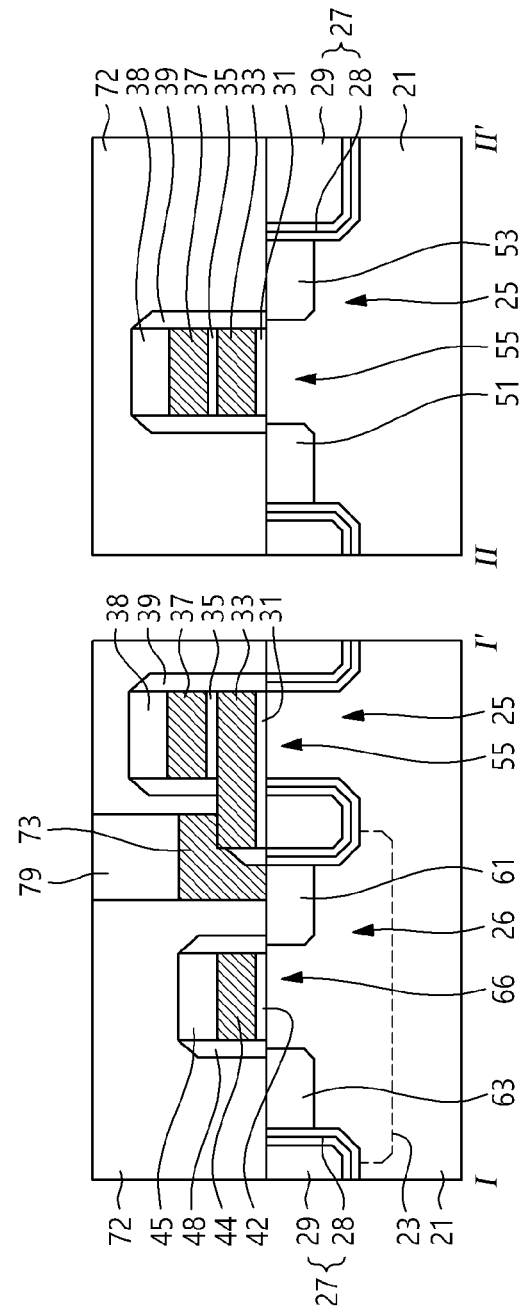

Referring to FIGS. 3 and 30, an interconnection 73 and a contact capping pattern 79 may be sequentially formed in the opening 72H. The interconnection 73 may contact the upper and side surfaces of the charge retention node 33, and may contact the third source/drain region 61. The interconnection 73 may be formed in a variety of ways to include configurations similar to those described above with reference to FIGS. 5 to 8. The interconnection 73 may include a single layer or multiple layers. The interconnection 73 may include a conductive material such as metal, metal oxide, metal nitride, metal silicide, polysilicon, conductive carbon or a combination thereof. The contact capping pattern 79 may be formed in the opening 72H to cover the interconnection 73. The contact capping pattern 79 may include silicon oxide, silicon nitride, silicon oxynitride, low-k dielectric, high-k dielectric or a combination thereof.

Figure 31:
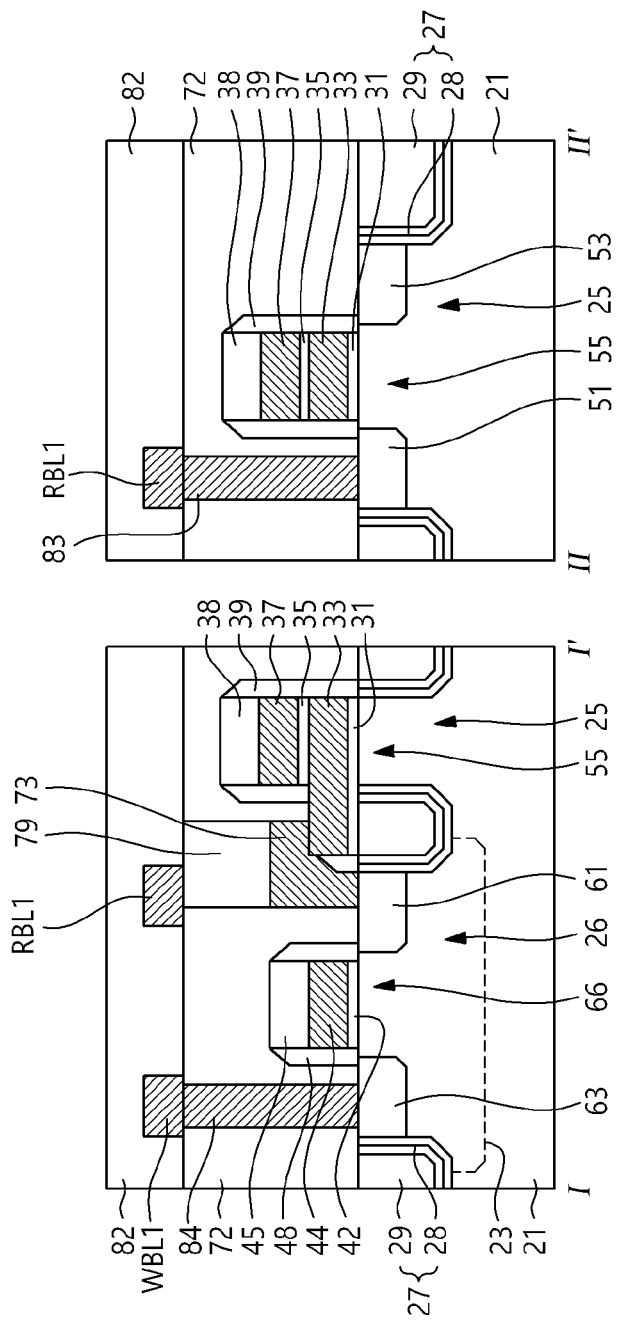

Referring to FIGS. 3 and 31, a first contact plug 83, which contacts the first source/drain region 51 by passing through the first interlayer insulating layer 72, and a second contact plug 84, which contacts the fourth source/drain region 63 by passing through the first interlayer insulating layer 72, may be formed. A first read bit line RBL1 and a first write bit line WBL1 may be formed on the first interlayer insulating layer 72.

The first read bit line RBL1 may contact the first contact plug 83. The first write bit line WBL1 may contact the second contact plug 84. A second interlayer insulating layer 82, which covers the first read bit line RBL1 and the first write bit line WBL1, may be formed on the first interlayer insulating layer 72. The second interlayer insulating layer 82 may include silicon oxide, silicon nitride, silicon oxynitride, low-k dielectric, high-k dielectric or a combination thereof.

Referring to FIGS. 1 and 3 again, a third contact plug 85, which contacts the second source/drain region 53 by passing through the second interlayer insulating layer 82 and the first interlayer insulating layer 72, may be formed. A fourth contact plug 86, which contacts the first gate electrode 37 by passing through the second interlayer insulating layer 82, the first interlayer insulating layer 72 and the first capping pattern 38, may be formed. A fifth contact plug 87, which contacts the second gate electrode 44 by passing through the second interlayer insulating layer 82, the first interlayer insulating layer 72 and the second capping pattern 45, may be formed. A first read word line RWL1, which contacts the third contact plug 85, may be formed on the second interlayer insulating layer 82. A first write word line WWL1, which contacts the fourth contact plug 86 and the fifth contact plug 87, may be formed on the second interlayer insulating layer 82.

Each of the first contact plug 83, the second contact plug 84, the third contact plug 85, the fourth contact plug 86, the fifth contact plug 87, the first read word line RWL1, the first read bit line RBL1, the first write word line WWL1 and the first write bit line WBL1 may include a single layer or multiple layers. Each of the first contact plug 83, the second contact plug 84, the third contact plug 85, the fourth contact plug 86, the fifth contact plug 87, the first read word line RWL1, the first read bit line RBL1, the first write word line WWL1 and the first write bit line WBL1 may include a conductive material such as metal, metal oxide, metal nitride, metal silicide, polysilicon, conductive carbon or a combination thereof.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A semiconductor device comprising:
   first and second transistors disposed on a substrate,
   wherein the first transistor comprises:
   first and second source/drain regions;
   a first channel region between the first and second source/drain regions;
   a first gate electrode over the first channel region; and
   a charge retention node between the first channel region and the first gate electrode, and
   wherein the second transistor comprises:
   third and fourth source/drain regions, a portion of the third source/drain region being connected to the charge retention node;
   a second channel region between the third and fourth source/drain regions; and
   a second gate electrode over the second channel region.

2. The semiconductor device according to claim 1, wherein the second gate electrode is connected to the first gate electrode.

3. The semiconductor device according to claim 2, further comprising:
   a write word line connected to the first gate electrode and the second gate electrode;
   a read bit line connected to the first source/drain region;
   a read word line connected to the second source/drain region; and
   a write bit line connected to the fourth source/drain region.

4. The semiconductor device according to claim 1, wherein the charge retention node includes a conductive material such as metal, metal oxide, metal nitride, metal silicide, polysilicon, conductive carbon or a combination thereof.

5. The semiconductor device according to claim 1, further comprising:
   an interconnection between the third source/drain region and the charge retention node.

6. The semiconductor device according to claim 5, wherein the interconnection contacts upper and side surfaces of the charge retention node.

7. The semiconductor device according to claim 5, further comprising:
   a Schottky barrier layer between the interconnection and the third source/drain region.

8. The semiconductor device according to claim 7, wherein
   the third source/drain region includes P-type impurities of a first concentration, and
   the Schottky barrier layer includes P-type impurities of a second concentration that is lower than the first concentration.

9. The semiconductor device according to claim 7, wherein the interconnection includes TiN, W, Al or a combination thereof.

10. The semiconductor device according to claim 1, wherein the second channel region includes impurities of a conductivity type different from that of impurities of the first channel region.

11. The semiconductor device according to claim 10, wherein
    the first channel region includes a semiconductor layer with P-type impurities, and
    the second channel region includes a semiconductor layer with N-type impurities.

12. The semiconductor device according to claim 1, further comprising:
    a channel dielectric layer between the first channel region and the charge retention node; and
    a gate dielectric layer between the charge retention node and the first gate electrode, wherein an equivalent oxide thickness (EOT) of the gate dielectric layer is 0.5 to 2 times that of an EOT of the channel dielectric layer.

13. The semiconductor device according to claim 12, wherein an EOT of the gate dielectric layer is substantially the same as an EOT of the channel dielectric layer.

14. A semiconductor device comprising:
a read word line extending in a row direction;
a write word line spaced apart from the read word line in a column direction;
a plurality of write bit lines, spaced apart from each other, that intersect with the read word line and the write word line;
a plurality of read bit lines, spaced apart from each other, that intersect with the read word line and the write word line; and
a plurality of memory cells adjacent to intersections of the plurality of write bit lines and the plurality of read bit lines with the read word line and the write word line,
wherein each of the plurality of memory cells includes a read transistor and a write transistor,
the read transistor comprising
a first gate electrode over a channel region; and
a charge retention node between the channel region and the first gate electrode, and
the write transistor comprising
a source/drain region connected to the charge retention node; and
a second gate electrode connected to the first gate electrode.

15. The semiconductor device according to claim 14, wherein
the plurality of memory cells include first to third memory cells that are arranged in the row direction,
the first to third memory cells include first to third read transistors and first to third write transistors, respectively,
the first read transistor of the first memory cell is disposed adjacent to the second read transistor of the second memory cell, and
the second write transistor of the second memory cell is disposed adjacent to the third write transistor of the third memory cell.

16. The semiconductor device according to claim 14, wherein the first gate electrode and the second gate electrode are connected to the write word line.

17. The semiconductor device according to claim 16, wherein the read transistor is an NMOS transistor, and the write transistor is a PMOS transistor.

18. A semiconductor device comprising:
first and second read word lines spaced apart from each other in a column direction, each of the first and second read word lines extending in a row direction;
first and second write word lines spaced apart from each other in the column direction, each of the first and second write word lines extending in the row direction;
a first write bit line intersecting with the first and second read word lines and the first and second write word lines;
a first read bit line intersecting with the first and second read word lines and the first and second write word lines;
a first memory cell adjacent to intersections of the first write bit line and the first read bit line which intersect with the first read word line and the first write word line; and
a fourth memory cell adjacent to intersections of the first write bit line and the first read bit line, which intersect with the second read word line and the second write word line,
wherein the first memory cell includes a first read transistor and a first write transistor;
wherein the fourth memory cell includes a fourth read transistor and a fourth write transistor;
wherein the first read transistor comprises:
first and second source/drain regions,
a first channel region between the first and second source/drain regions,
a first gate electrode over the first channel region, and
a charge retention node between the first channel region and the first gate electrode;
wherein the first source/drain region of the first read transistor contacts a third channel region of the fourth read transistor; and
wherein the first write transistor comprises:
third and fourth source/drain regions, the third source/drain region being connected to the charge retention node,
a second channel region between the third and fourth source/drain regions, and
a second gate electrode over the second channel region.

19. The semiconductor device according to claim 18, further comprising:
a third write word line disposed in the column direction of the second write word line, and the second write word line disposed between the first write word line and the third write word line; and
a seventh memory cell adjacent to intersections of the first write bit line and the first read bit line, which intersect with the second read word line and the third write word line,
wherein the seventh memory cell includes a seventh read transistor and a seventh write transistor, and
wherein one of a source and a drain of the fourth read transistor and one of a source and a drain of the seventh read transistor are connected to the second read word line.

20. The semiconductor device according to claim 18, wherein the second gate electrode is connected to the first gate electrode, and the first gate electrode and the second gate electrode are connected to the first write word line.

* * * * *